(12) United States Patent
Gray et al.

(10) Patent No.: US 11,720,106 B2
(45) Date of Patent: Aug. 8, 2023

(54) SENSOR COVERAGE ANALYSIS FOR AUTOMATED DRIVING SCENARIOS INVOLVING INTERSECTIONS

(71) Applicant: GM GLOBAL TECHNOLOGY OPERATIONS LLC, Detroit, MI (US)

(72) Inventors: Jeremy P. Gray, Clarkston, MI (US); Grant A. Soremekun, Pacifica, CA (US); Daniel S. Maitlen, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 885 days.

(21) Appl. No.: 16/735,975

(22) Filed: Jan. 7, 2020

(65) Prior Publication Data
US 2021/0208588 A1 Jul. 8, 2021

(51) Int. Cl.
*G05D 1/02* (2020.01)
*G05B 17/02* (2006.01)
*B60R 11/04* (2006.01)
*G08G 1/01* (2006.01)
*G08G 1/0968* (2006.01)

(52) U.S. Cl.
CPC ............ *G05D 1/0212* (2013.01); *B60R 11/04* (2013.01); *G05B 17/02* (2013.01); *G08G 1/0112* (2013.01); *G08G 1/0141* (2013.01); *G08G 1/096877* (2013.01); *G05D 2201/0213* (2013.01)

(58) Field of Classification Search
CPC .......... G05D 1/0212; G05D 2201/0213; B60R 11/04; G05B 17/02; G08G 1/0112; G08G 1/0141; G08G 1/096877; G08G 1/165; G08G 1/166; G08G 1/0962; G08G 1/0104;
(Continued)

(56) References Cited

U.S. PATENT DOCUMENTS 10,134,276 B1 * 11/2018 Barker ................. G08G 1/0116
10,885,776 B2 * 1/2021 Amacker ............... G08G 1/165
(Continued)

FOREIGN PATENT DOCUMENTS

CN          103680127 A      3/2014
CN          104134356 A     11/2014
(Continued)

OTHER PUBLICATIONS

Chinese Search Report Issued in Chinese Application No. 202110011475.0 dated Jul. 27, 2022; 1 Page.

*Primary Examiner* — Richard M Camby
(74) *Attorney, Agent, or Firm* — Cantor Colburn LLP

(57) ABSTRACT

Examples described herein provide a computer-implemented method that includes defining, by a processing device, a plurality of parameters so that any orthogonal intersection can be described. The method further includes building, by the processing device, an orthogonal parameterized model that can represent any orthogonal intersection based at least in part on the plurality of parameters that can describe any intersection of interest. The method further includes expanding, by the processing device, the orthogonal parameterized model to generate a fully parameterized intersection model that accounts for intersection complexities. The method further includes building, by the processing device, a low-fidelity analytical that computes various metrics based on the fully parameterized intersection model.

20 Claims, 18 Drawing Sheets

(58) Field of Classification Search
CPC .......... G08G 1/0125; G08G 1/096725; G06V 20/56; G06F 30/13; G06F 30/15
See application file for complete search history.

(56) References Cited

U.S. PATENT DOCUMENTS

| | | | |
|---|---|---|---|
| 11,482,106 B2* | 10/2022 | Kanade | G08G 1/0145 |
| 2008/0030374 A1 | 2/2008 | Kumon et al. | |
| 2013/0151135 A1* | 6/2013 | Aubrey | G08G 1/0116 |
| | | | 701/117 |
| 2014/0195138 A1* | 7/2014 | Stelzig | G08G 1/0116 |
| | | | 701/119 |
| 2015/0325119 A1* | 11/2015 | Lehnertz | G08G 1/0133 |
| | | | 701/117 |

FOREIGN PATENT DOCUMENTS

| | | |
|---|---|---|
| CN | 109270933 A | 1/2019 |
| CN | 109582993 A | 4/2019 |
| CN | 110597711 A | 12/2019 |

* cited by examiner

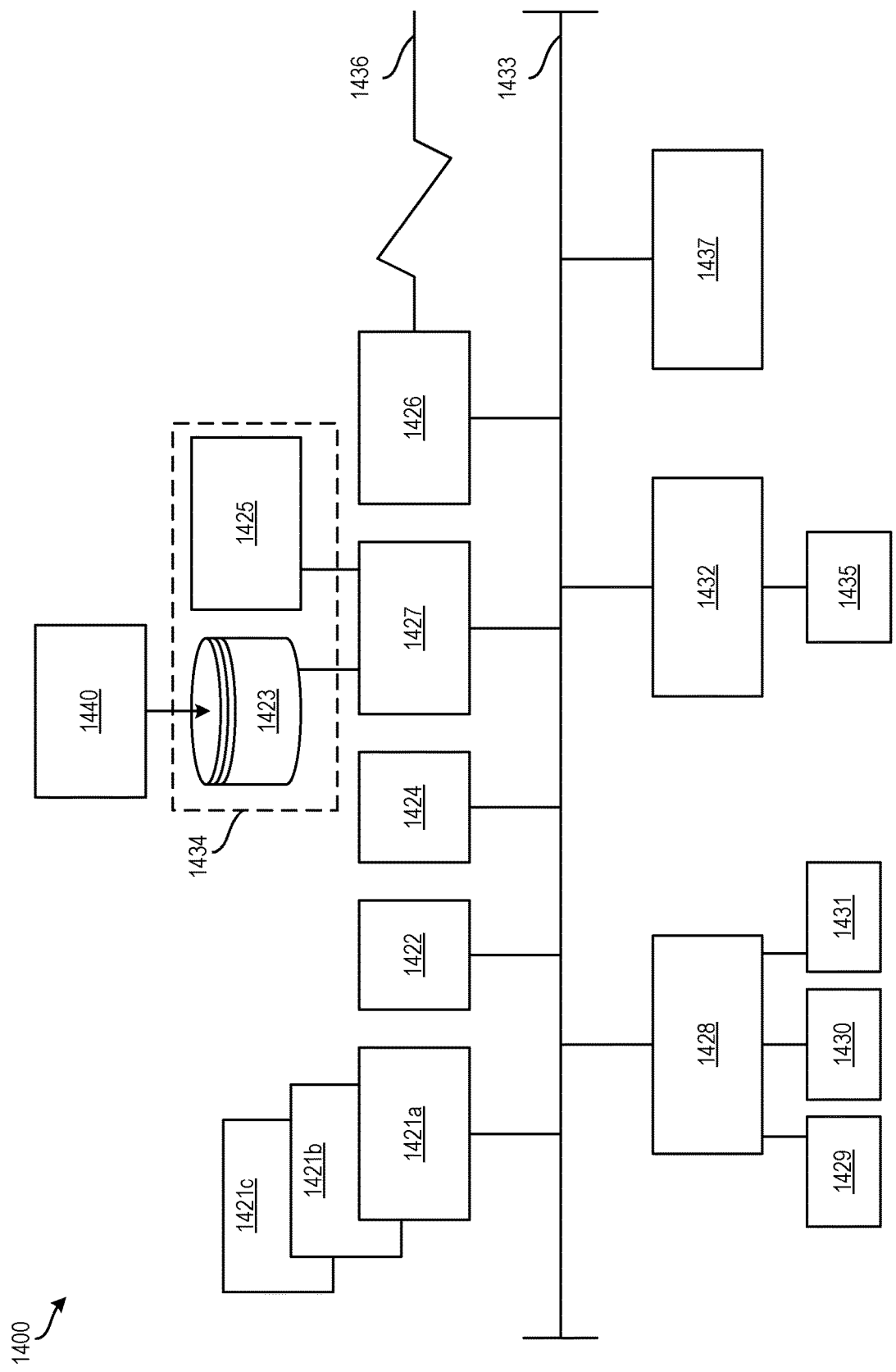

SENSOR COVERAGE ANALYSIS FOR AUTOMATED DRIVING SCENARIOS INVOLVING INTERSECTIONS

INTRODUCTION

The subject disclosure relates to controlling a vehicle and, more particularly, to sensor coverage analysis for automated driving scenarios involving intersections.

Vehicles (e.g., a car, a motorcycle, a boat, or any other type of automobile) may be equipped with sensors and navigation systems that provide navigation information to drivers of the vehicles and/or enable autonomous control of the vehicles. For example, sensors (e.g., cameras, proximity sensors, high-resolution radar sensors, light imaging detection and ranging (Lidar) sensors, etc.) collect data about a vehicle's surroundings, including objects, people, or other vehicles. Data collected from the sensors (referred to as "sensor data") can be used in conjunction with data about the vehicle (referred to as "vehicle data") such as location, speed, direction, etc., to autonomously control the vehicle. For example, the sensor data and vehicle data can be used to control the vehicle to traverse an intersection.

SUMMARY

Embodiments of the present invention are directed to sensor coverage analysis for automated driving scenarios involving intersections.

In one exemplary embodiment, a computer-implemented method includes defining, by a processing device, a plurality of parameters so that any orthogonal intersection can be described. The method further includes building, by the processing device, an orthogonal parameterized model that can represent any orthogonal intersection based at least in part on the plurality of parameters that can describe any intersection of interest. The method further includes expanding, by the processing device, the orthogonal parameterized model to generate a fully parameterized intersection model that accounts for intersection complexities. The method further includes building, by the processing device, a low-fidelity analytical that computes various metrics based on the fully parameterized intersection model.

In addition to one or more of the features described herein, in some examples building the orthogonal parameterized model further includes representing a vehicle as an ellipse.

In addition to one or more of the features described herein, in some examples, expanding the orthogonal parameterized model further incudes calculating the ellipse is based on the following formula for the vehicle when the vehicle is turning left:

$$EllipC = \pi(a+b)\left\{3 - \frac{(a-b)^2}{(a+b)^2\left(\sqrt{-3\frac{(a-b)^2}{(a+b)^2}+4}+10\right)} + 1\right\}$$

where "a" is a total lateral distance from a stop bar associated with the vehicle to a center left target line in meters, and where "b" is a total longitudinal distance from the stop bar associated with the vehicle to the center left target line in meters.

In addition to one or more of the features described herein, in some examples the method further includes calculating an arcturn distance of the vehicle based on the ellipse.

In addition to one or more of the features described herein, in some examples the method further includes calculating an arcturn time of the vehicle based on the ellipse.

In addition to one or more of the features described herein, in some examples, the intersection complexities include at least one of a positive road curvature, a negative road curvature, and an intersection angle.

In addition to one or more of the features described herein, in some examples, the intersection complexities include a positive road curvature, a negative road curvature, and an intersection angle.

In addition to one or more of the features described herein, in some examples the method further includes using vehicle sensor semantic detections and a high-definition map to obtain intersection properties. The method further includes using the low-fidelity analytical model to estimate a time required for a host vehicle to complete a maneuver. The method further includes obtaining a velocity, an acceleration, and a location relative to the host vehicle for a plurality of actors. The method further includes using the low-fidelity analytical model to estimate time for actor to reach an intersection or the host vehicle; and displaying a message to a user whether it is safe to perform the maneuver.

In addition to one or more of the features described herein, in some examples, the intersection properties include a number of lanes, a lane width, and a road curvature.

In addition to one or more of the features described herein, in some examples the method further includes setting parameter values for the intersection of interest. The method further includes setting a velocity, an acceleration, and a location relative to a host vehicle for a plurality of actors. The method further includes using the low-fidelity analytical model to estimate how far away from the host vehicle the plurality of actors need to be detected so that the host vehicle can safely complete a maneuver. The method further includes designing a sensor placement arrangement that defines a location for each of a plurality of sensors associated with the host vehicle.

In another exemplary embodiment, a system includes a memory having computer readable instructions and a processing device for executing the computer readable instructions, the computer readable instructions controlling the processing device to perform operations including defining, by the processing device, a plurality of parameters so that any orthogonal intersection can be described. The operations further include building, by the processing device, an orthogonal parameterized model that can represent any orthogonal intersection based at least in part on the plurality of parameters that can describe any intersection of interest. The operations further include expanding, by the processing device, the orthogonal parameterized model to generate a fully parameterized intersection model that accounts for intersection complexities. The operations further include building, by the processing device, a low-fidelity analytical that computes various metrics based on the fully parameterized intersection model.

In addition to one or more of the features described herein, in some examples building the orthogonal parameterized model further includes representing a vehicle as an ellipse.

In addition to one or more of the features described herein, in some examples, expanding the orthogonal parameterized model further includes calculating the ellipse is based on the following formula for the vehicle when the vehicle is turning left:

$$EllipC = \pi(a+b)\left(3-\frac{(a-b)^2}{(a+b)^2\left(\sqrt{-3\frac{(a-b)^2}{(a+b)^2}+4}+10\right)}+1\right)$$

where "a" is a total lateral distance from a stop bar associated with the vehicle to a center left target line in meters, and where "b" is a total longitudinal distance from the stop bar associated with the vehicle to the center left target line in meters.

In addition to one or more of the features described herein, in some examples, the intersection complexities include at least one of a positive road curvature, a negative road curvature, and an intersection angle.

In addition to one or more of the features described herein, in some examples, the intersection complexities include a positive road curvature, a negative road curvature, and an intersection angle.

In addition to one or more of the features described herein, in some examples the operations further include using vehicle sensor semantic detections and a high-definition map to obtain intersection properties. The operations further include using the low-fidelity analytical model to estimate a time required for a host vehicle to complete a maneuver. The operations further include obtaining a velocity, an acceleration, and a location relative to the host vehicle for a plurality of actors. The operations further include using the low-fidelity analytical model to estimate time for actor to reach an intersection or the host vehicle. The operations further include displaying a message to a user whether it is safe to perform the maneuver.

In addition to one or more of the features described herein, in some examples, the intersection properties include a number of lanes, a lane width, and a road curvature.

In addition to one or more of the features described herein, in some examples the operations further include setting parameter values for the intersection of interest. The operations further include setting a velocity, an acceleration, and a location relative to a host vehicle for a plurality of actors. The operations further include using the low-fidelity analytical model to estimate how far away from the host vehicle the plurality of actors need to be detected so that the host vehicle can safely complete a maneuver. The operations further include designing a sensor placement arrangement that defines a location for each of a plurality of sensors associated with the host vehicle.

In yet another exemplary embodiment a computer program product includes a computer readable storage medium having program instructions embodied therewith, the program instructions executable by a processing device to cause the processing device to perform operations, which include defining, by the processing device, a plurality of parameters so that any orthogonal intersection can be described. The operations further include building, by the processing device, an orthogonal parameterized model that can represent any orthogonal intersection based at least in part on the plurality of parameters that can describe any intersection of interest. The operations further include expanding, by the processing device, the orthogonal parameterized model to generate a fully parameterized intersection model that accounts for intersection complexities. The operations further include building, by the processing device, a low-fidelity analytical that computes various metrics based on the fully parameterized intersection model.

In addition to one or more of the features described herein, in some examples, building the orthogonal parameterized model further includes representing a vehicle as an ellipse, and wherein expanding the orthogonal parameterized model further includes calculating the ellipse is based on the following formula for the vehicle when the vehicle is turning left:

$$EllipC = \pi(a+b)\left(3-\frac{(a-b)^2}{(a+b)^2\left(\sqrt{-3\frac{(a-b)^2}{(a+b)^2}+4}+10\right)}+1\right)$$

where "a" is a total lateral distance from a stop bar associated with the vehicle to a center left target line in meters, and where "b" is a total longitudinal distance from the stop bar associated with the vehicle to the center left target line in meters.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIG. 14 depicts a block diagram of an example of a processing system for implementing the techniques described herein.

DETAILED DESCRIPTION

Figure 1:
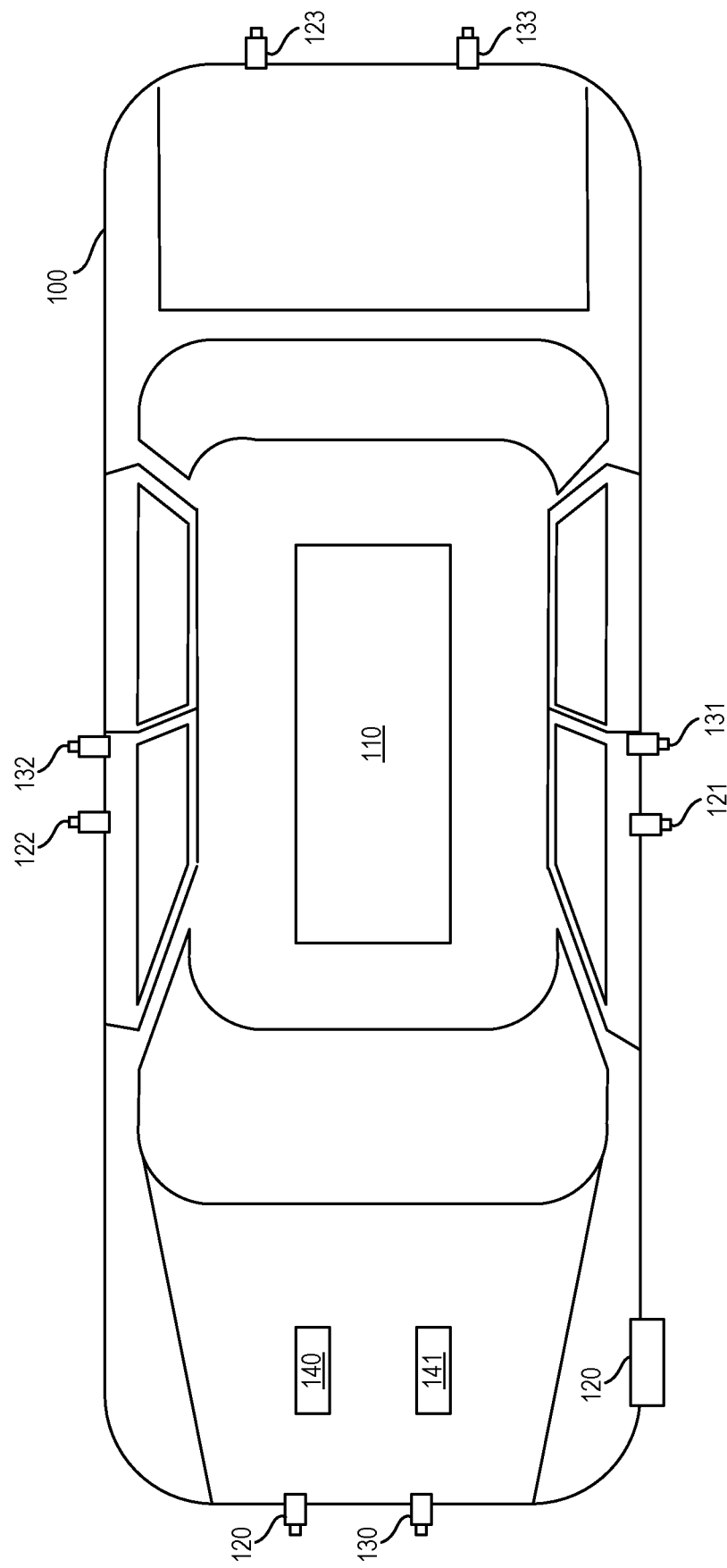
FIG. 1 depicts a vehicle including a processing system for performing automated driving according to one or more embodiments described herein.

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for sensor coverage analysis for automated driving scenarios involving uncontrolled intersections or other types of intersections. This can be useful to support the development of automated driving sensing coverage requirements or for real-time (or near real-time) decision making and control in automated driving. In particular, embodiments described herein provide a light-weight, fully parameterized intersection model with a methodology of automated driving scenario analysis that can be used for early requirements development, component performance verification, and component selection/placement, and that enables evaluation of many (e.g., hundreds of thousands or more) intersection cases in the early stages of the sensing system development process and/or in real-time or near-real-time while performing an automated driving maneuver.

Intersections yield some of the most complex scenarios that automated driving features perform. Existing automated driving approaches do not enable easily determining sensing system coverage requirements for intersection scenarios. In particular, there currently exists no known tool or process that supports sensing architecture analysis for intersections, no robust analysis technique for sensing coverages in intersections, and no theoretical dataset on intersection detection requirements.

The embodiments described herein address these shortcomings of the prior art by building a parameterized model based on a plurality of parameters that can describe any orthogonal intersection of interest. The parameterized model is then expanded to generate a fully parameterized intersection model that accounts for intersection complexities. Then, a low-fidelity analytical model is built based on the fully parameterized intersection model. The low-fidelity analytical model can be used in advanced driver-assistance systems and/or to design sensor placement arrangements for a vehicle.

One or more embodiments described herein utilize vehicle perception. Vehicle perception provides for object detection and recognition by processing images captured by one or more sensors, such as cameras associated with a vehicle (e.g., a car, a motorcycle, a boat, or any other type of vehicle). Vehicle perception aids a driver/operator of a vehicle by providing information external to the vehicle and/or aids autonomous vehicles by providing information useful for making driving decisions (e.g., whether to accelerate, brake, turn, etc.).

Modern vehicles generally include cameras and other sensors (e.g., radar sensors, LiDAR sensors, proximity sensors, etc.) that provide backup assistance, take images of the vehicle driver to determine driver drowsiness or attentiveness, provide images of the road (as the vehicle is traveling) for collision avoidance purposes, provide structure recognition such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

These vehicles may also be equipped with an in-vehicle display (e.g., a touchscreen) that is used to display camera images and/or other images to a driver of the vehicle. For example, a traditional rear-view mirror and/or side-view mirror may be replaced with a display that displays a camera image from a camera positioned at the rear of the vehicle to display the "rear view" to the driver in place of the traditional rear-view mirror.

An example of such a vehicle is depicted in FIG. 1. In particular, FIG. 1 depicts a vehicle 100 including a processing system 110 for performing automated driving according to one or more embodiments described herein. The vehicle 100 may be a car, truck, van, bus, motorcycle, or another suitable vehicle.

The processing system 110 performs automated driving maneuvers based on data received from sensors associated with the vehicle 100. According to examples, the processing system 110 associated with the vehicle 100 is responsible for vehicle perception by analyzing images captured by a plurality of cameras associated with the vehicle 100.

According to one or more embodiments described herein, the processing system 110 can also be configured to perform advanced driver assistance such that the processing system 110 is an advanced driver-assistance system (ADAS). ADAS assists an operator of a vehicle while maneuvering a vehicle. Examples of ADAS include traction control, anti-lock brakes, electronic stability control, lane departure, adaptive cruise control, and the like.

In the example of FIG. 1, the vehicle 100 includes cameras 120, 121, 122, 123, and cameras 130, 131, 132, 133. According to one or more embodiments described herein, the cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be used for operating the vehicle (e.g., parking, backing, etc.) either manually and/or autonomously. According to one or more embodiments described herein, the cameras 130-133 are long-range cameras that capture images external to the vehicle and farther away from the vehicle 100 than the cameras 120-123. These images can be processed using vehicle perception techniques, for example. The results of the vehicle perception can be used for object detection and avoidance, among other things. It should be appreciated that, although eight cameras 120-123 and 130-133 are shown, more or fewer cameras may be implemented in various embodiments.

The captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view. The displayed images can also be overlaid with information determined during processing/analysis. For example, an image can be overlaid with distance information (e.g., distance from the vehicle 100 to another object/vehicle), safety information (e.g., a warning of a potential collision), and the like.

The vehicle 100 can also include sensors, such as sensors 140, 141. According to one or more embodiments, the sensor 140 represents a high-resolution radar, and the sensor 141 represents a light imaging detection and ranging (LIDAR) sensor. Other numbers and types of sensors can be used, such as proximity sensors.

The processing system 110 uses images captured from one or more of the cameras 120-123, 130-133 to perform vehicle perception using deep neural networks. For example, the vehicle perception can include performing feature extraction, object detection and avoidance, and the like.

Figure 2:
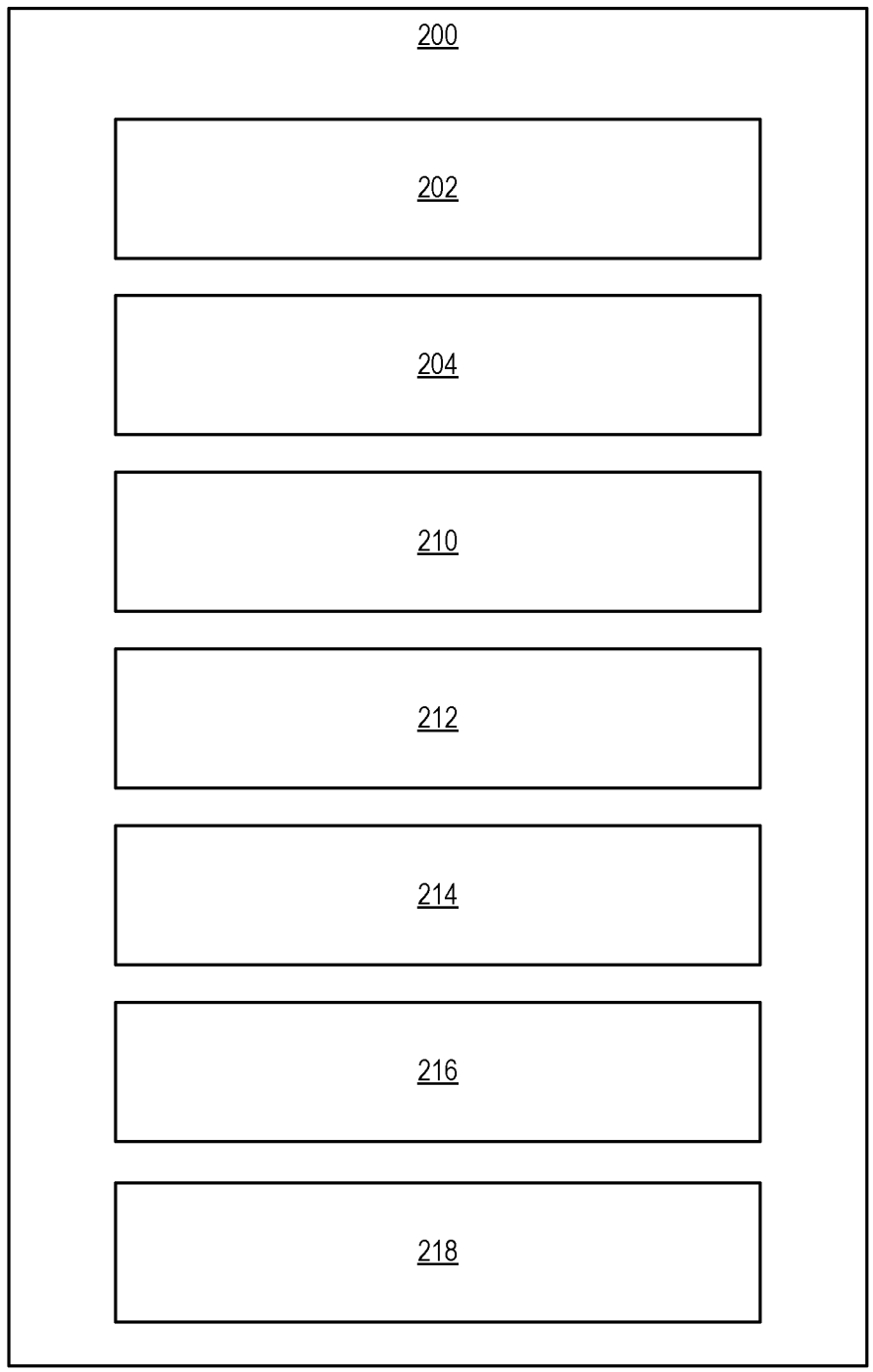
FIG. 2 depicts the processing system for sensor coverage analysis for automated driving scenarios and/or for controlling a vehicle according to one or more embodiments described herein.

FIG. 2 depicts the processing system 200 for sensor coverage analysis for automated driving scenarios and/or for controlling a vehicle according to one or more embodiments described herein. The processing system 200 includes a processing device 202 (e.g., the CPU 1421 of FIG. 14), a memory 204 (e.g., the RAM 1424 of FIG. 14), a parameter engine 210, a parameterized model engine 212, a mathematical analysis model engine 214, a sensor layout engine 216, and a vehicle control engine 218. In some examples, one or more of the components/engines of the processing system 200 can be included in the processing system 110 of the vehicle 100 of FIG. 1.

The various components, modules, engines, etc. described regarding FIGS. 1 and 2 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., the CPU 1421 of FIG. 14) for executing those instructions. Thus a system memory (e.g., the RAM 1424 of FIG. 14) can store program instructions that when executed by the processing device implement the engines described herein. Other engines can also be utilized to include other features and functionality described in other examples herein.

In some examples, the processing system 200 is distinct from and in wired and/or wireless electrical communication with the processing system 110, such as via a network. Thus, in some examples (see, e.g., FIG. 4A), the present techniques enable real-time or near-real-time decision making to control a vehicle in/through an intersection using advanced driver-assistance systems (ADAS). This improves vehicle technology by improving autonomous control of the vehicle, thereby improving efficiency, reliability, safety, and the like. This essentially becomes an active safety vehicle function that can alert, warn, and/or make vehicle control decisions to prevent or minimize collisions. In other examples, (see, e.g., FIG. 4B), the present techniques provide a sensor placement arrangement that defines a location for each of a plurality of sensors associated with the vehicle 100. This also improves vehicle technology by improving sensor location and coverage for the vehicle 100, enabling efficient and increased data collection with a minimal number of sensors.

The features and functionality of the processing systems 110 and 200 are now described with reference to FIGS. 3, 4A, and 4B.

Figure 3:
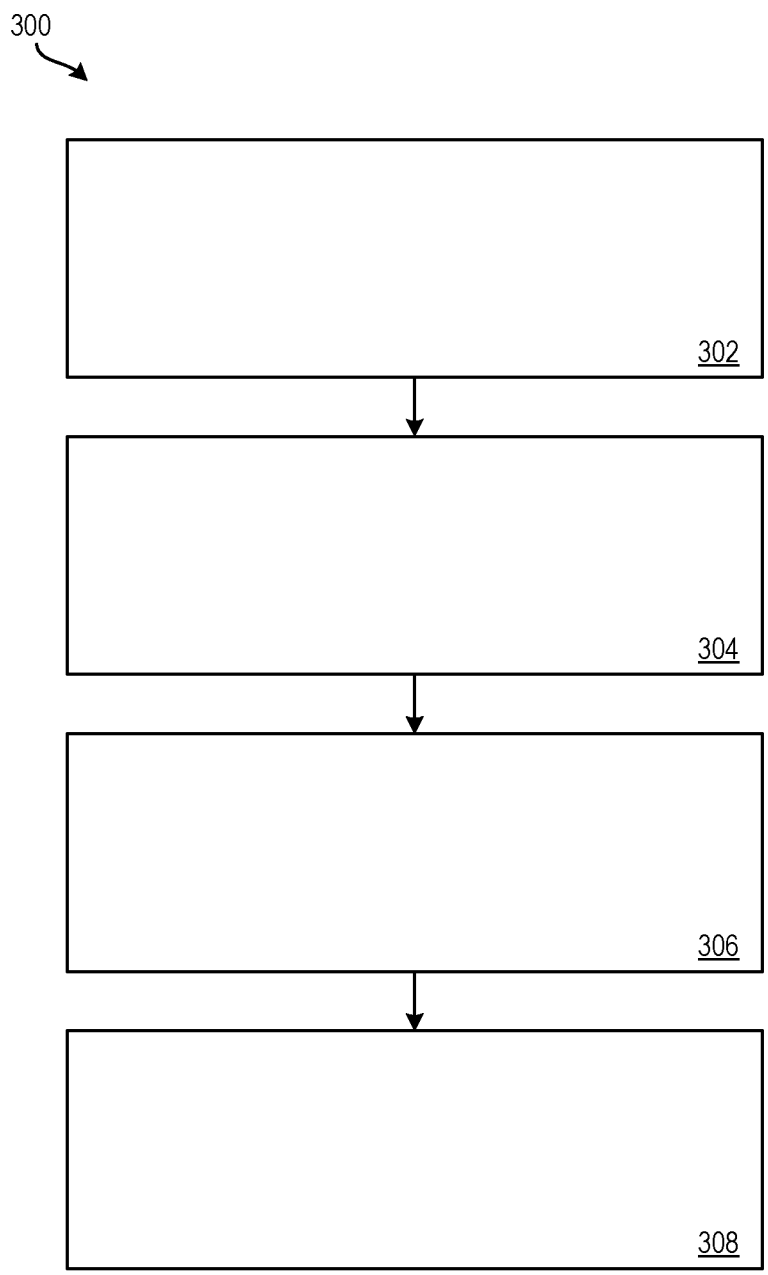
FIG. 3 depicts a flow diagram of a method for an offline process to develop a low-fidelity analytical model according to one or more embodiments described herein.

FIG. 3 depicts a flow diagram of a method 300 for an offline process to develop a low-fidelity analytical model according to one or more embodiments described herein. The method 300 can be implemented by any suitable processing system, processing device, or combination thereof, including those processing system(s) and processing device(s) described herein. FIG. 3 is now described with reference to FIGS. 1 and 2 but is not so limited.

At block 302, a plurality of parameters is defined, via the parameter engine 210 of the processing system 210 so that any orthogonal intersection can be described.

At block 304, the parameterized model engine 212 builds a parameterized model that can represent any orthogonal intersection based on the plurality of parameters that can describe any orthogonal intersection of interest.

At block 306, the parameterized model engine 212 expands the parameterized model to generate a fully parameterized intersection model that accounts for intersection complexities. The orthogonal parameterized model is expanded to account for, for example, complicated road curvatures and intersections having angles other than right angles.

At block 308, the mathematical analysis model engine 214 builds a low-fidelity analytical model that computes various metrics based on the fully parameterized intersection model. Examples of such various metrics include detection range and angle based on the intersection size and complexities, system latencies, and actor and host velocity profiles. This enables the mathematical analysis model to represent the desired automated driving scenario. The low-fidelity model can be used in ADAS (see FIG. 4A) and/or for designing a sensor placement arrangement (see FIG. 4B)

Additional processes also may be included, and it should be understood that the process depicted in FIG. 3 represents an illustration, and that other processes may be added or existing processes may be removed, modified, or rearranged without departing from the scope of the present disclosure.

Figure 4A:
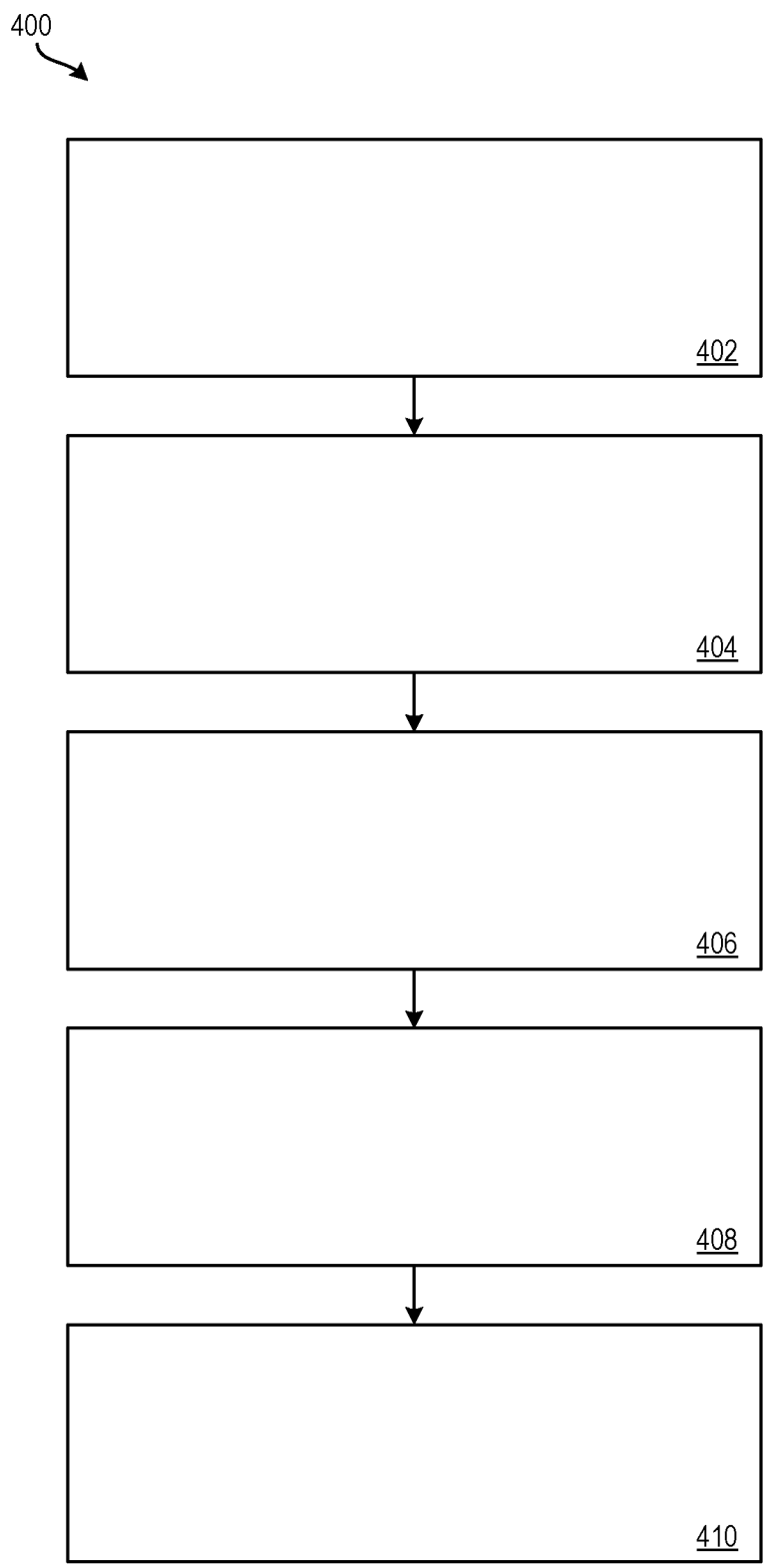
FIG. 4A depicts a flow diagram of a method for a process for using the low-fidelity analytical model of FIG. 3 in advanced driver-assistance systems according to one or more embodiments described herein.

FIG. 4A depicts a flow diagram of a method 400 for a process for using the low-fidelity analytical model of FIG. 3 in ADAS according to one or more embodiments described herein. The method 400 can be implemented by any suitable processing system, processing device, or combination thereof, including those processing system(s) and processing device(s) described herein. FIG. 4A is now described with reference to FIG. 1 but is not so limited.

At block 402, the processing system 110 uses vehicle sensor semantic detections and a hi-definition map to obtain intersection properties, such as number of lanes, lane widths, road curvatures, etc.

At block 404, the processing system 110 uses the low fidelity analytical model of FIG. 3 (see block 308) to estimate time required for host to complete. This is further described herein with reference to blocks 1410 and 1418 of FIG. 14.

At block 406, the processing system 110 obtains velocity, acceleration, and location relative to host for all actors.

At block 408, the processing system 110 uses the low fidelity model to estimate time for actor to reach intersection/host.

At block 410, the processing system 110 displays a message to a user whether it is safe to perform the intersection turn maneuver.

Additional processes also may be included, and it should be understood that the process depicted in FIG. 4A represents an illustration, and that other processes may be added or existing processes may be removed, modified, or rearranged without departing from the scope of the present disclosure.

Figure 4B:
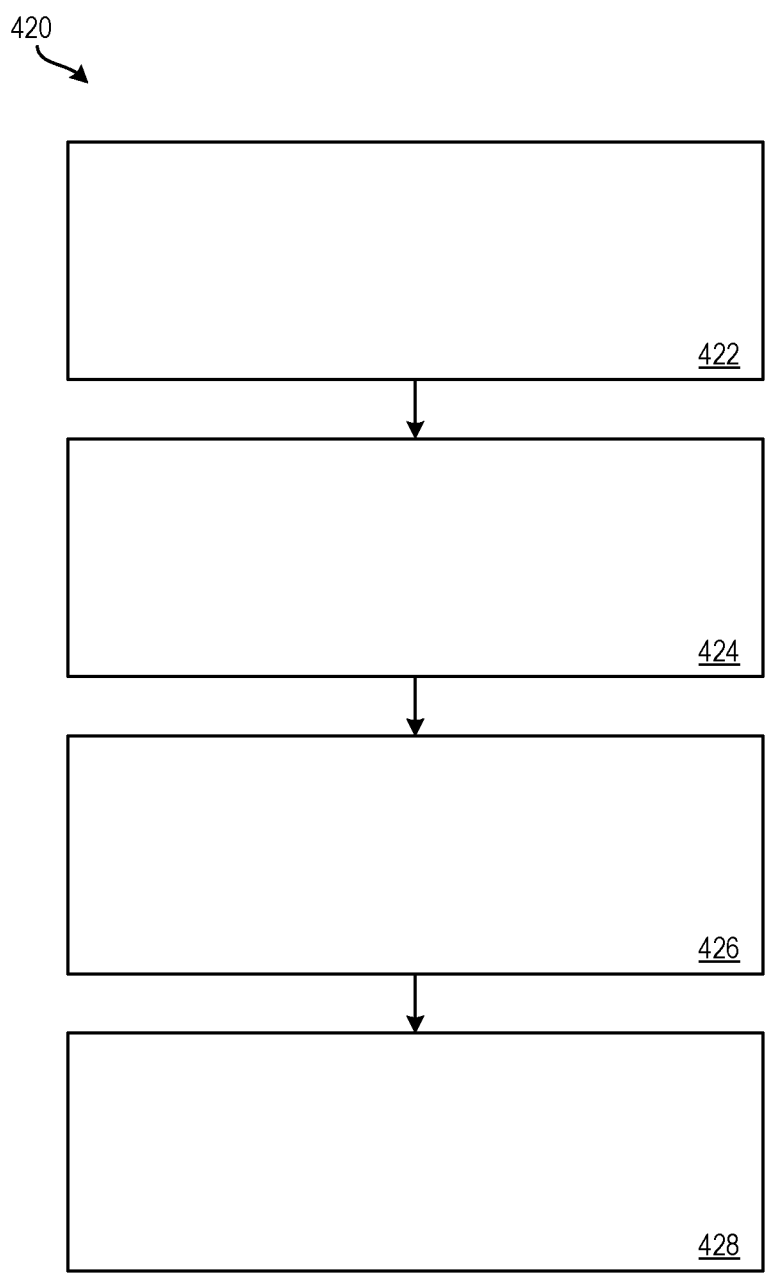
FIG. 4B depicts a flow diagram of a method for a process for using the low-fidelity analytical model of FIG. 3 to design a sensor placement arrangement according to one or more embodiments described herein.

FIG. 4B depicts a flow diagram of a method 420 for a process for using the low-fidelity analytical model of FIG. 3 to design a sensor placement arrangement according to one or more embodiments described herein. The method 400 can be implemented by any suitable processing system, processing device, or combination thereof, including those processing system(s) and processing device(s) described herein. FIG. 4A is now described with reference to FIG. 2 but is not so limited.

At block 422, via parameter engine 210 of the processing system 200, parameter values for an intersection of interest are set.

At block 424, via the processing system 200, velocity, acceleration, and location relative to the host for all actors are set.

At block 426, via the mathematical analysis model engine 214 of the processing system 200, the low-fidelity analytical model of FIG. 3 is used to estimate how far from the host all actors need to be to be detected so that the host can safely complete an intersection turn maneuver.

At block 428, via the sensor layout engine 216 of the processing system 200, a sensor placement arrangement is designed that defines a location for each of a plurality of sensors associated with the vehicle 100, for example.

Additional processes also may be included, and it should be understood that the process depicted in FIG. 4A represents an illustration, and that other processes may be added or existing processes may be removed, modified, or rearranged without departing from the scope of the present disclosure.

Parameters, as defined at block 302 of FIG. 3 and as utilized by the methods 400 and 420 of FIGS. 4A and 4B respectively, are now described in more detail. In-vehicle, activity safety functions may have additional clarification or means of extracting these parameters in examples. Road input parameters describe the features of a road, intersection, etc. Examples of road input parameters include the following total number of lanes approaching east (left to right) of host at intersection; total number of lanes receding west (right to left) of host at intersection; total number of lanes approaching south towards host at intersection; lane width; angle and curvature of road to left of host, road right of host, and road in front of host; etc.

Road output parameters also describe the features of a road, intersection, etc. Examples of road output parameters include the following: total lateral and longitudinal distance from host stop bar to center of left target lane; total lateral and longitudinal distance from host stop bar to center of left actor lane of travel; total lateral and longitudinal distance from host stop bar to center of right actor lane of travel; total lateral distance from host center to center of front actor lane of travel; total longitudinal distance from host stop bar to stop bar crossing all lanes of traffic; total right turning travel ellipse (arc) distance; total left turning travel ellipse (arc) distance; etc.

Figure 5:
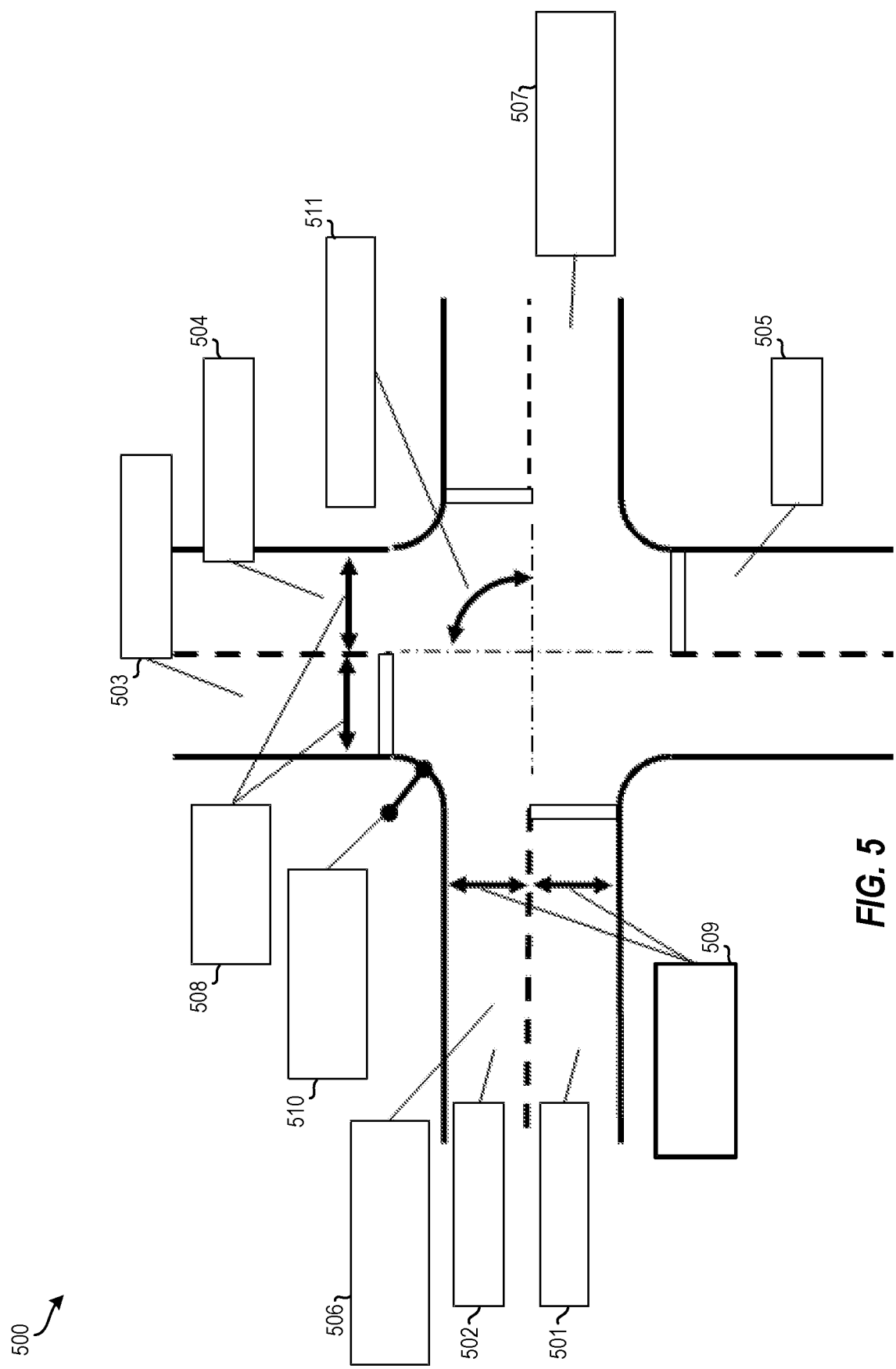
FIG. 5 depicts an intersection having parameters according to one or more embodiments described herein.

FIG. 5 depicts an example intersection 500 having the following parameters for a host vehicle (not shown; e.g., the vehicle 100) as an example according to one or more embodiments described herein: east lanes 501, west lanes 502, south lanes 503, north lanes 504, host lane 505, host lane when turning left 506, host lane when turning right 507, forward lane widths 508, cross traffic lane widths 509, intersection junction radius 510, and intersection angle 511.

These and/or other suitable parameters are defined by the parameter engine 210 (see block 302 of FIG. 3) and are used by the parameterized model engine 212 to build an orthogonal parameterized model that represent the intersection of interest as an orthogonal intersection based at least in part on the plurality of parameters associated with the intersection of interest.

The input intersection parameters facilitate an orthogonal geometric representation of the intersection. An orthogonal intersection is a representation of an actual intersection that is represented to have roads that intersect at substantially right angles. Through the use of simplistic geometric shapes (e.g., an ellipse) and related formulae, an automated driving scenario is depicted as an orthogonal representation for host (e.g., the vehicle 100) and actor (e.g., another vehicle, object, etc.) maneuvers. The origin of the orthogonal representation is aligned to the actor centerline of travel and the longitudinal centerline of the host.

Figure 6:
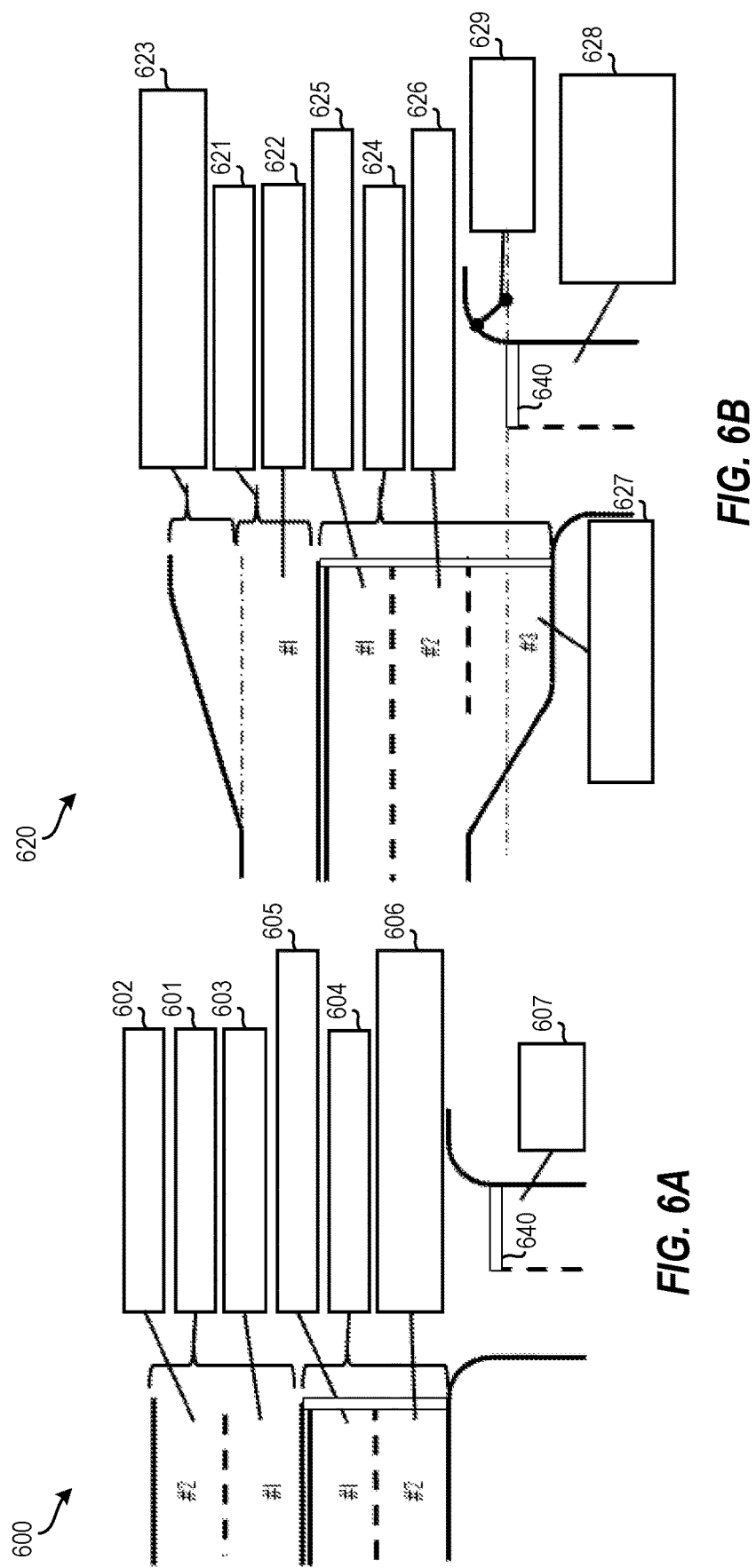
FIGS. 6A and 6B depict intersections having parameters according to one or more embodiments described herein.

Using the example parameters from FIG. 5, FIGS. 6A and 6B are now described, which depict intersections 600, 620 respectively according to one or more embodiments described herein. The example intersection 600 includes: west lanes 601 having straight continuous lanes 602, 603; east lanes 604 having a left turn only and/or straight thru lane 605 and a right turn only and/or straight through lane 606; and a host lane 607. The example intersection 620 includes: west lanes 621 having straight continuous lane 622 and extra width 623 that is accounted for in the intersection junction radius 629 (see element 510 of FIG. 5); east lanes 624 having a left turn only or straight thru lane 625, a right turn only or straight thru lane 626, and a right turn only lane 627, recessed to host stop bar 640 longitudinal position; and host lane 628, which is forward of the turn lane, thus turn lane is not counted.

In the examples of FIGS. 6A, 6B, consider the following driving scenarios. When turning left, actors from the right are measured based on the aligned lane(s) on the left of the intersection. When turning right, the host target line should address the lane numbering on the left of the intersection (e.g., four lanes in FIG. 6A and four lanes in FIG. 6B). Further, when turning right, there is a dedicated turn lane receded behind the host stop bar 640 (see FIG. 6B); that lane is excluded from longitudinal calculations.

Figure 7:
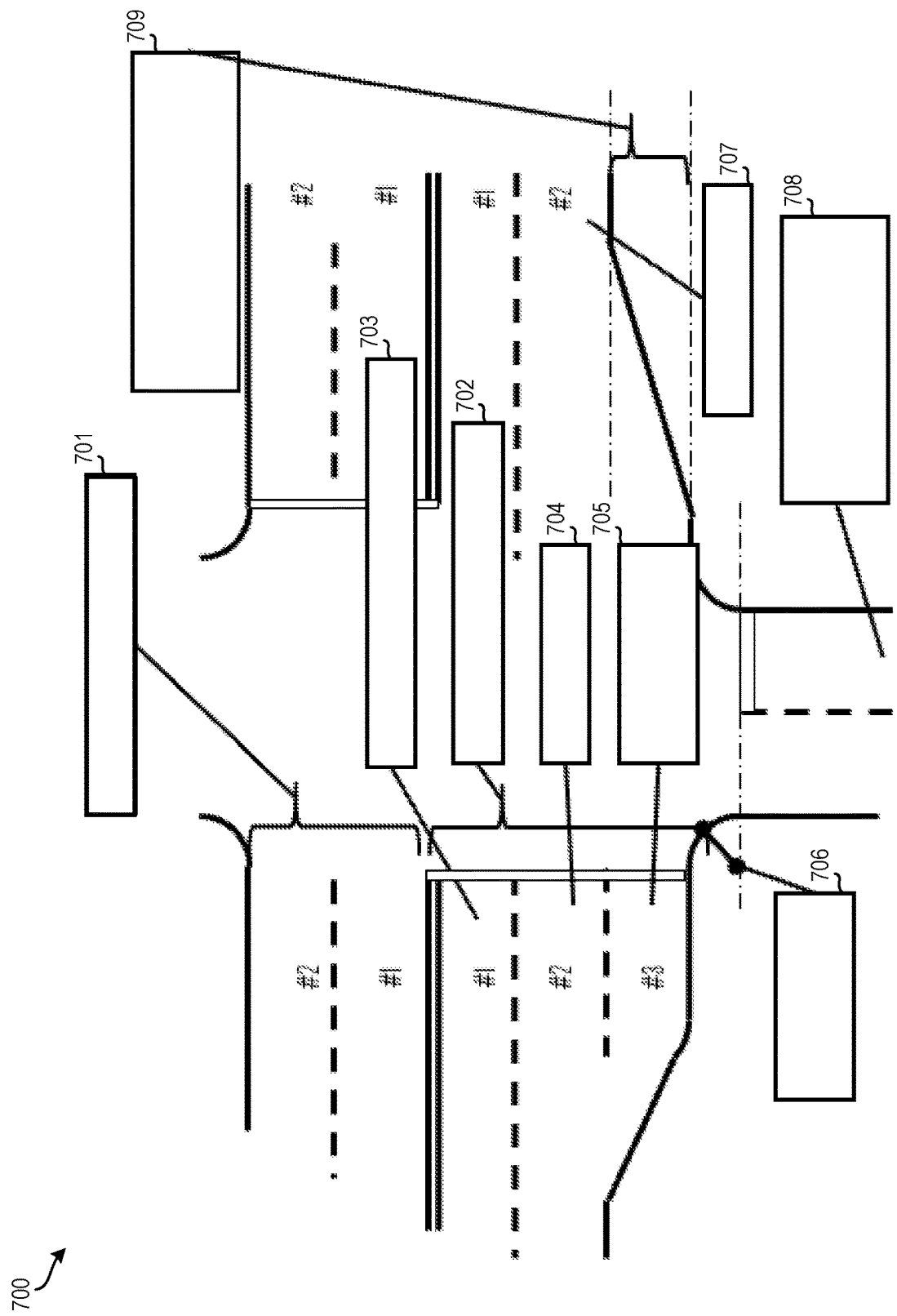
FIG. 7 depicts another example intersection having parameters according to one or more embodiments described herein.

FIG. 7 depicts another example intersection 700 according to one or more embodiments described herein. The example intersection 700 includes west lanes 701 having two lanes; east lanes 702 having a left turn only or straight thru lane 703, a straight thru lane 704, and a turn only lane 705, which is not recessed; an intersection junction radius 706; a host target lane 707; a host lane 708, which is forward of the host target lane 707; and extra width (no lane) 709, which is accounted for in the intersection junction radius 706. In this example, when the host is turning right and the dedicated cross traffic turn only lane (e.g., the lane 705) is not recessed and does not continue, the host is required to longitudinally skip an area (e.g., the extra width 709) to reach the host target lane 707.

Figure 8B:
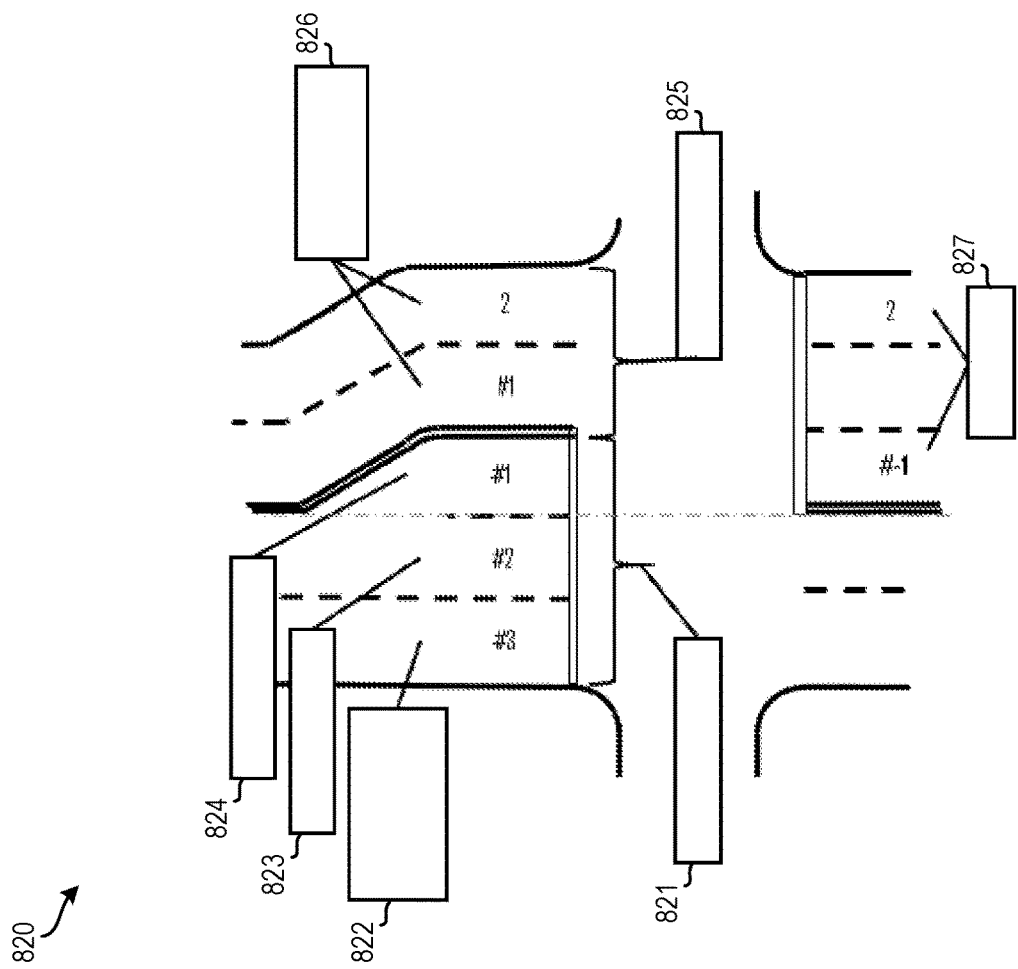
FIGS. 8A and 8B depict intersections having parameters according to one or more embodiments described herein.
Figure 8A:
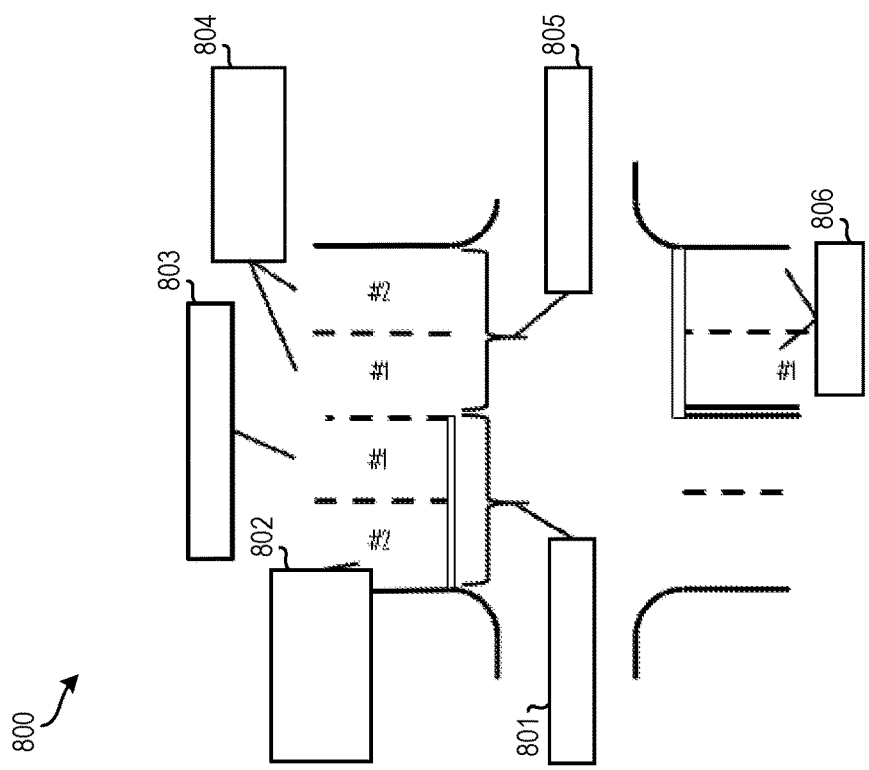

FIGS. 8A and 8B depict intersections 800, 820 having parameters according to one or more embodiments described herein. In this example, the intersection 800 includes the following parameters: south lanes 801 including a right turn only or straight thru lane 802, and a straight or left thru lane 803; north lanes 805 including straight continuous lanes 804; and host lanes 806. The intersection 820 includes the following parameters: south lanes 821 that include a right turn only or straight thru lane 822, a straight thru lane 823, and a left turn only lane 824; north lanes 825 having straight continuous lanes 826; and host lanes 827. When the host is turning left, actors from the front are measured based on the lanes the host must cross to turn. When the host is turning right, actors from the front are measured based on the number of lateral lanes left of the host.

Figure 9A:
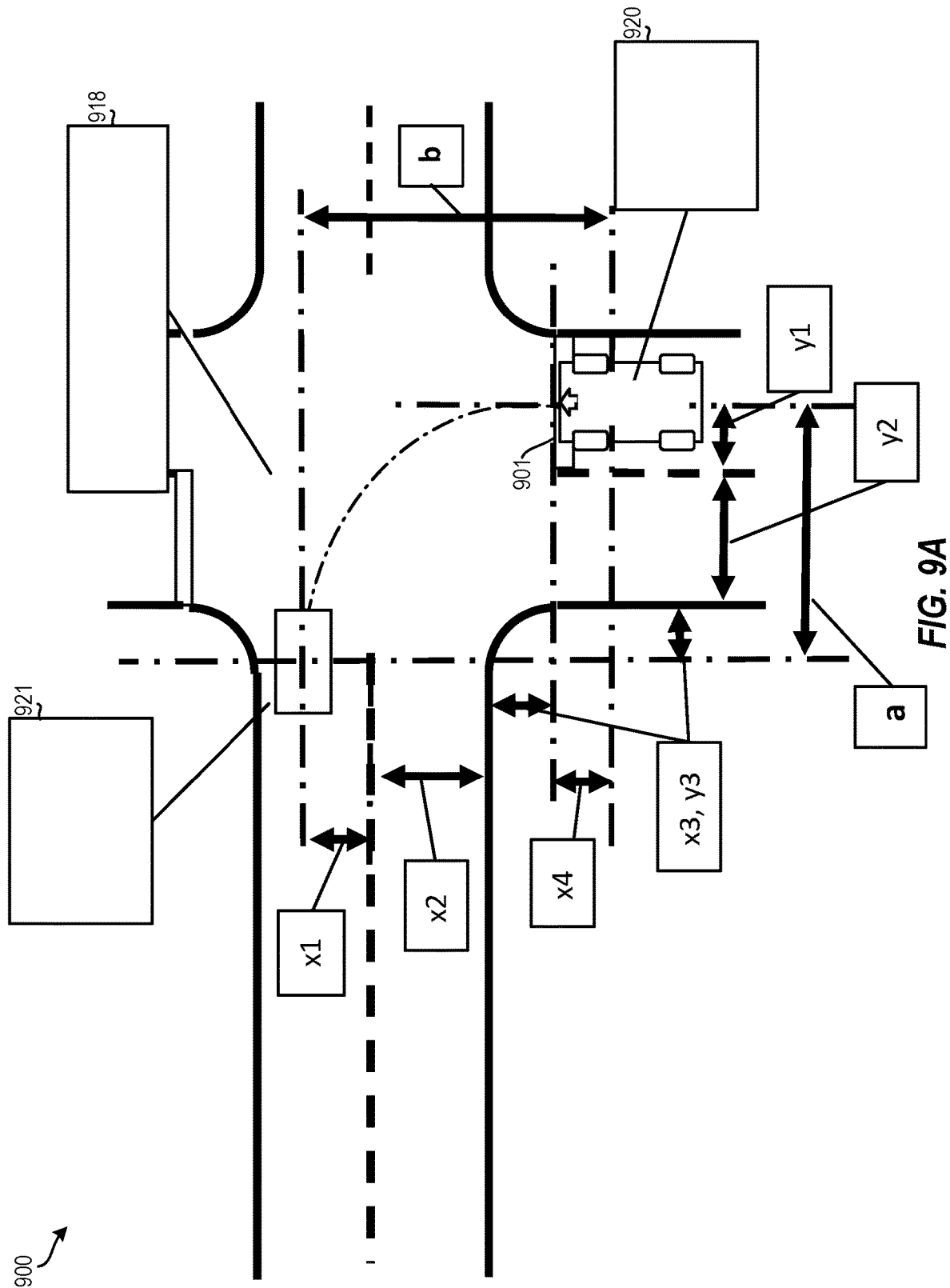
FIGS. 9A and 9B depict an example of left actor detection distance calculations for building an orthogonal parametrized model of an intersection according to one or more embodiments described herein.
Figure 9B:
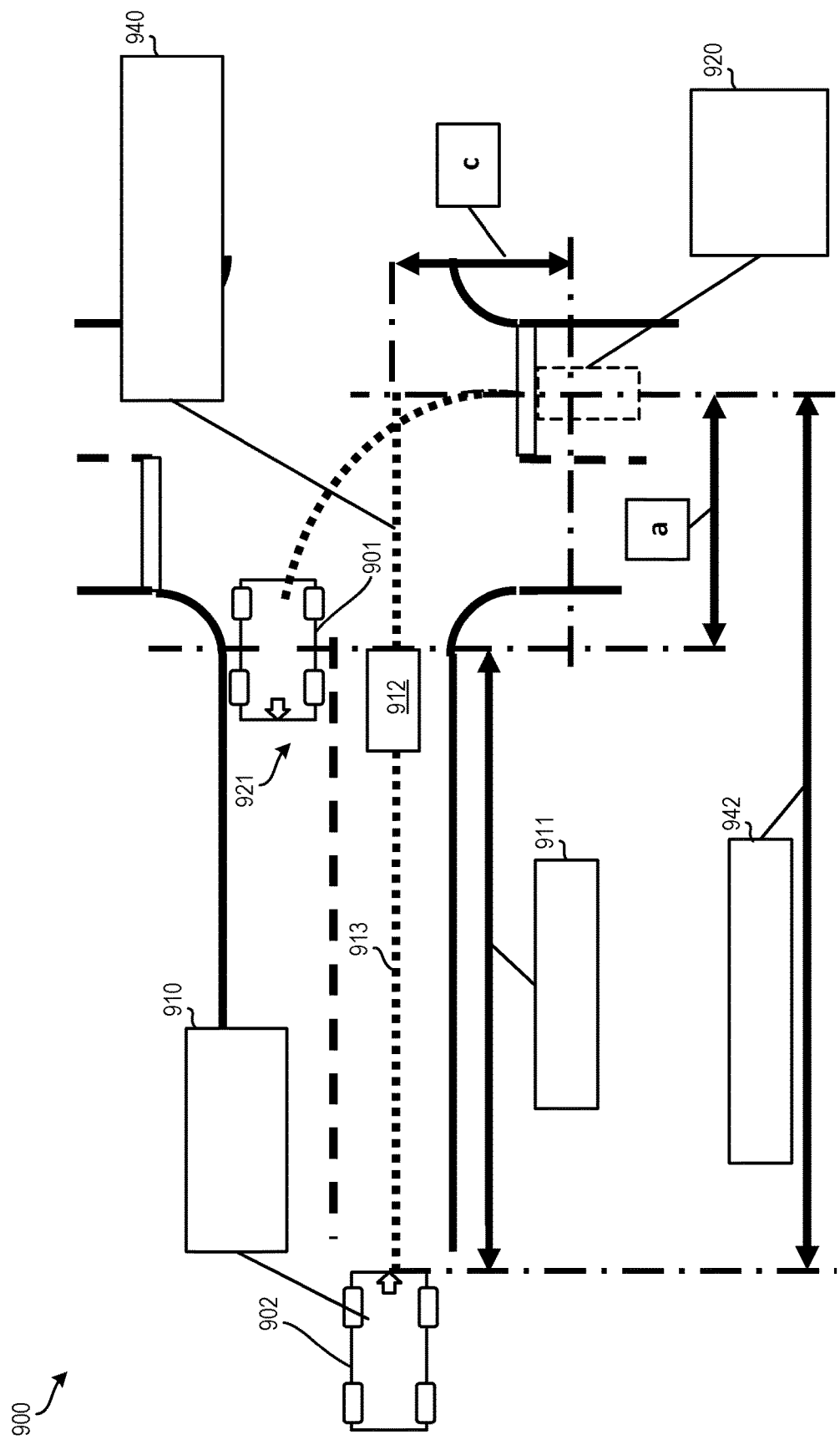

FIGS. 9A and 9B depict an example of left actor detection distance calculations for building an orthogonal parametrized model of an intersection 900 according to one or more embodiments described herein. This example is based on a host vehicle 901 (e.g., the vehicle 100) turning left as shown in FIGS. 9A, 9B, and in consideration of an actor 902.

In this example, the actor 902 is moving along a center line 913 of a lane as shown, and the host 901 is making a left turn as shown, beginning at the host initial position 920 and continuing to the host position after turn 921.

Regarding FIGS. 9A, 9B, the intersection 900 is modeled using an elliptical representation for the host 901 using the following parameters and equations:

$x1$ = Receding lanes width $* 0.5$;

$x2$ = Approaching lane widths $*$ the quantity of lanes;

$x3$ = Intersection junction radius (e.g., intersection junction radius 706 of FIG. 7);

$x4$ = Longitudinal distance from host 901 to stop bar(the stop bar 640 of FIGS .6A, 6B);

$b = x1 + x2 + x3 + x4$;

$y1$ = lateral distance from host 901 to lane line (lane lines that split direction of traffic);

$y2$ = Approaching lane widths south towwards host 901 $*$ the quantity of lanes $y3$ = Intersection junction radius;

$a = y1 + y2 + y3$;

$$EllipC = \pi(a+b)\left(3 - \frac{(a-b)^2}{(a+b)^2\left(\sqrt{-3\frac{(a-b)^2}{(a+b)^2} + 4} + 10\right)} + 1\right);$$

ellipse (arc) distance (block 918) = $EllipC/4$;

Arc_turn_time = ellipse (arc) discance/Arc_turn_velocity;

Time = distance/velocity.

FIG. 9B shows the host 901 having turned left to the host position after turn 921 from the host initial position 920. Also shown are the actor 902, which moves from an actor initial position 910 as depicted by an actor travel arrow 911 to an actor final position 912. The arc length distance 942 and a center lane for approaching left actor 940 are also shown.

Regarding block 408 of FIG. 4A for example, when the actor 902 is not decelerating:

Actor_Travel=
(Host_reaction_time*Actor_initial_Velocity)+
(Arc_turn_time*Actor_initial_Velocity)+(Actor
TTC margin*Actor_initial_Velocity)+safety_
margin When the actor 902 is decelerating:

Actor_Travel=
(Host_reaction_time*Actor_initial_Velocity)+
(Actor_reaction_time*Actor_initial_Velocity)+
($Vf^2$–Actor_initial_Velocity$^2$)/
(2*actor_deceleration_rate)+safety_margin, and $Vf$=actor final velocity+(actor_deceleration_rate*
(Actor TTC margin−Actor_reaction_time))

A total orthogonal lateral distance can then be determined as arc length distance 942=Actor_Travel+a.

FIGS. 5, 6A, 6B, 7, 8A, 8B, 9A, and 9B are each orthogonal parameterized models of intersections that represent various intersections of interest based on the provided parameters, as shown. Once the orthogonal parameterized model is built (see blocks 304, 404), the parameterized model engine 212 expands the orthogonal parameterized model to generate a fully parameterized model that accounts for intersection complexities (see blocks 306, 406).

The remaining input intersection parameters facilitate more complex, realistic geometric representations of the intersection for road curvatures and non-perpendicular intersections. Through the use of additional simplistic geometric and trigonometric shapes and formulae (e.g., curve, arcs, triangles, etc.), the driving scenario is depicted as a final accurate representation for host and actor maneuvers. This approach first correlates to the orthogonal origin and then translates to the host center of gravity.

Figure 10:
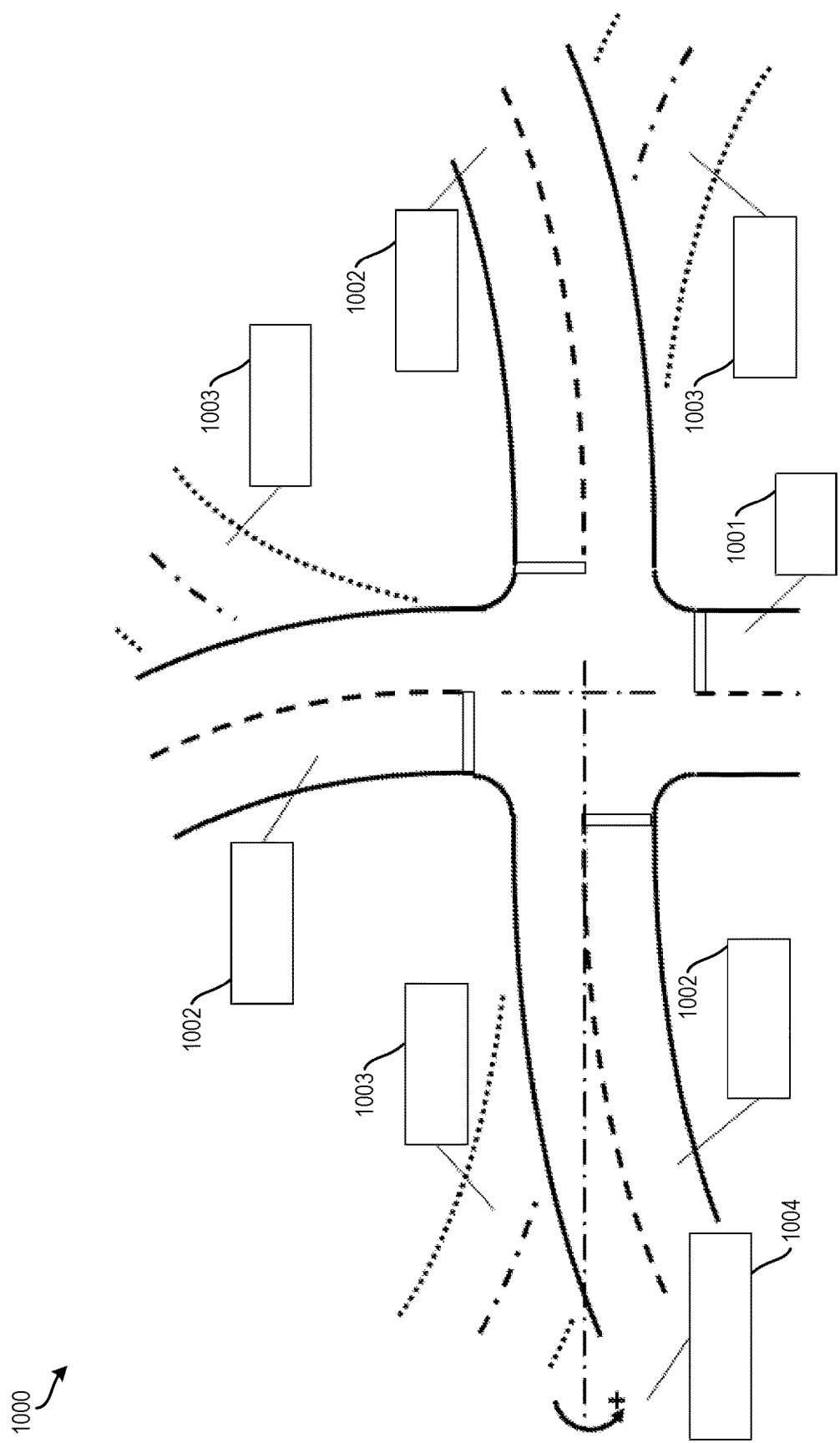
FIG. 10 depicts an intersection having a host lane and various complexities expanded from the orthogonal parameterized model according to one or more embodiments described herein.

For example, FIG. 10 depicts an intersection 1000 having a host lane 1001 and various complexities expanded from the orthogonal parameterized model. Examples of these complexities include: positive road curvatures 1002, negative road curvatures 1003, and intersection angles 1004, which can be positive or negative. The intersection angle is the angle between the two roads, which is assumed to be a right angle in the orthogonal parameterized model, but can be other than the right angle when the orthogonal parameterized model is expanded to account for intersection complexities.

Figure 11A:
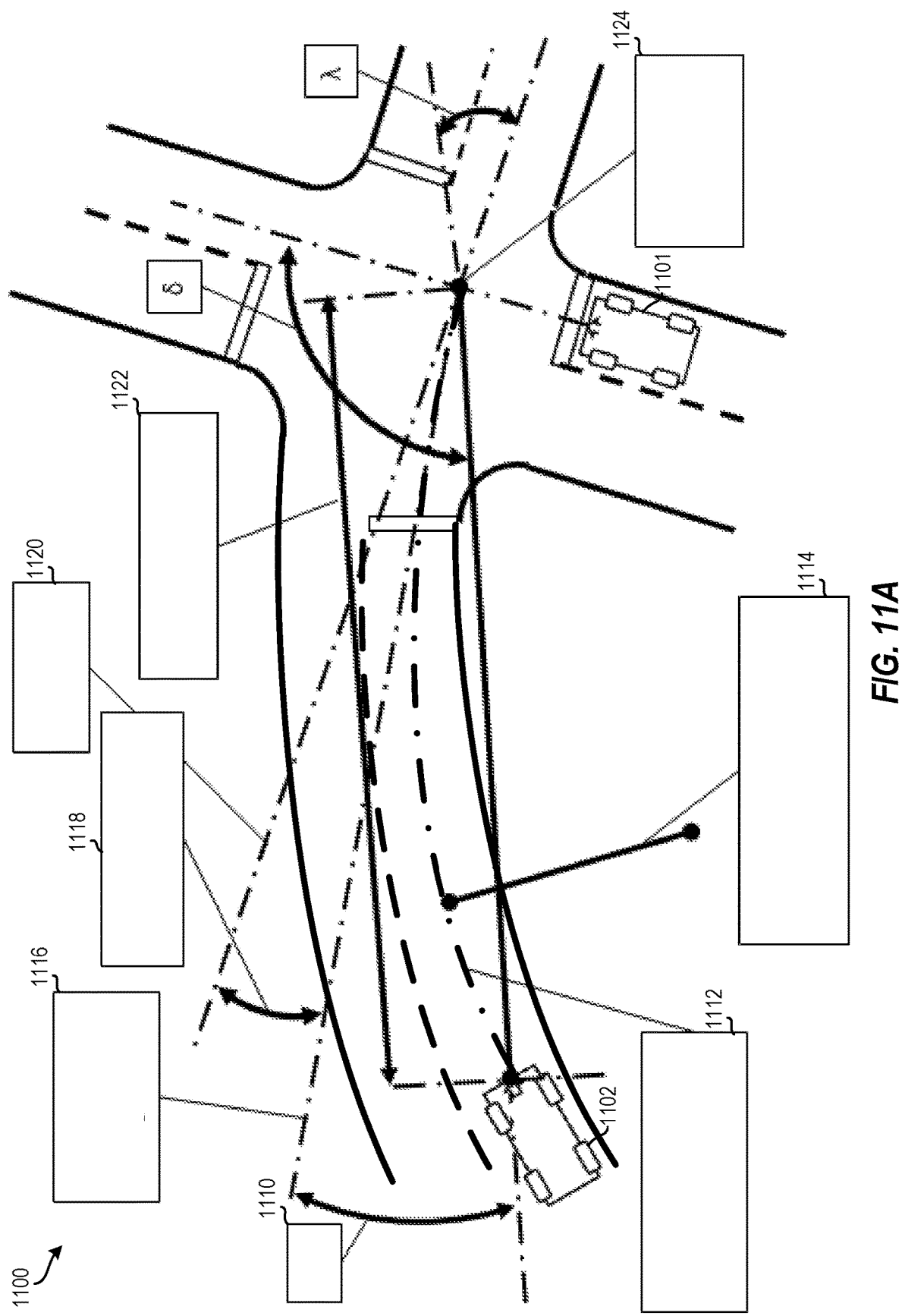
FIGS. 11A and 11B depict an example of left actor detection angle calculations for an intersection for a host and an actor according to one or more embodiments described herein when accounting for intersection complexities.
Figure 11B:
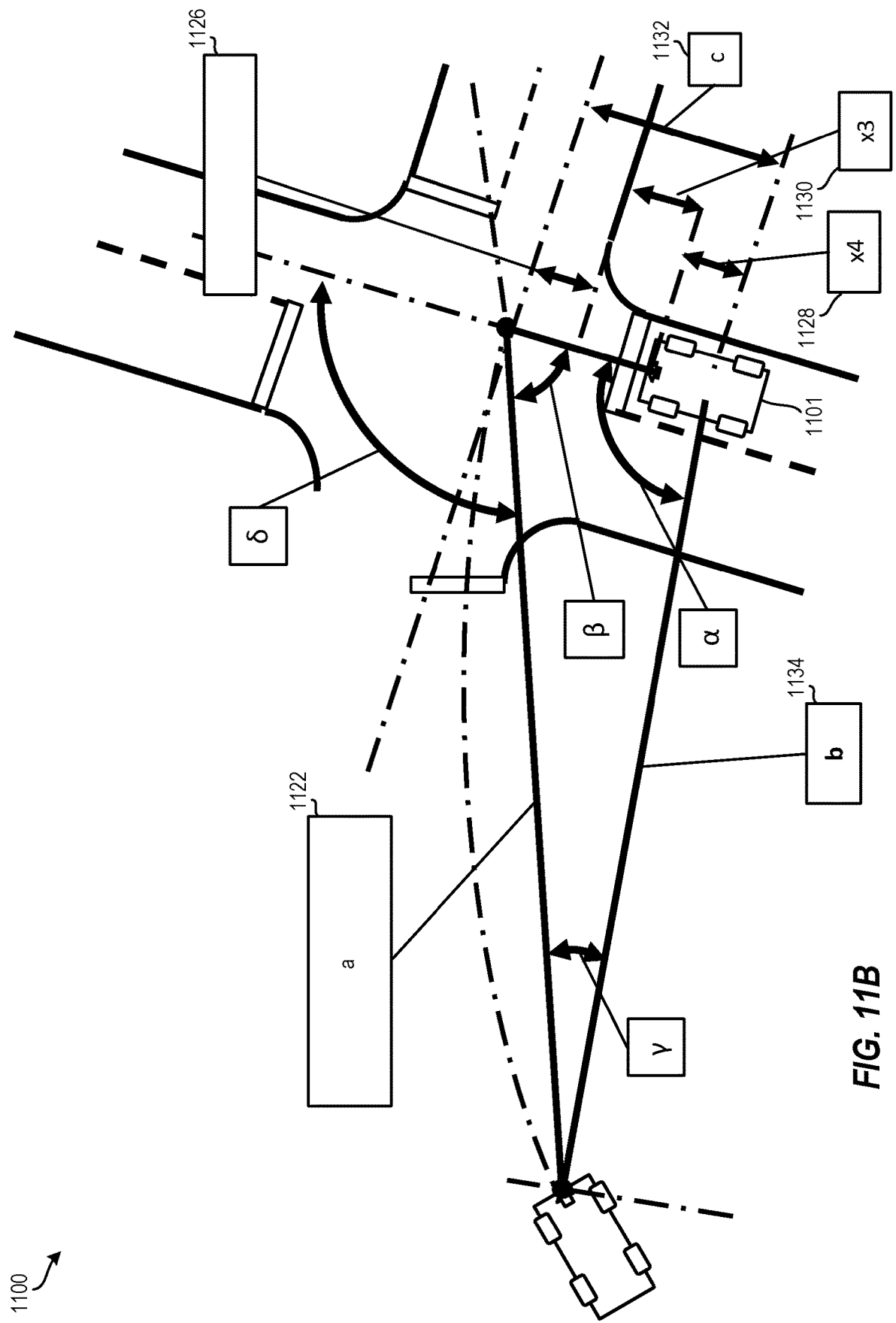

FIGS. 11A and 11B represent an example of left actor detection angle calculations for an intersection 1100 for a host 1101 and an actor 1102 according to one or more embodiments described herein when accounting for intersection complexities. In this sample illustration, a positive road curvature and intersection angle is represented but negative road curvatures and/or negative intersection angles can be accounted for in other examples. In this example, block 1110 is degrees between a distance from actor to origin of actor lane (a) and a general road curvature radius tangent line (block 1116) (DC), block 1112 is an arc length for actor distance traveled (arc length distance), block 1114 is a positive left cross traffic generalized road curve radius (road curvature), block 1116 is general road curvature radius tangent line, block 1118 is intersection angle theta, block 1120 is intersection centerline, block 1122 is distance from actor to origin of actor lane (a), block 1124 is an actor lane origin point, block 1126 is actor left (DO, block 1128 is a lane width x4, block 1130 is lane width x3, block 1132 is a combined lane width c, and block 1134 is a distance 'b' between the actor and the host.

The following calculations are performed to build a mathematical analysis model around the fully parameterized model (see steps 308, 408).

$DC$(block 1110) = 0.5 *

(180 * arc length distance (block 1112)/road curvature (block 1114) * $\pi$);

lamda = $DC$ + intersection angle (block 1118);

if lamda == 0

$$\text{delta} = 90;$$

else $$\text{delta} = 90 + \text{lamda};$$

end $a = 2 *$ road curvature (block 1114) * Sin ($DC$ (block 1110));

$D_{LC}$ = (actor lane of travel * approaching lane widths) −

(approaching lane widths * 0.5)

$c = D_{LC} + x3$(block 1130) $+ x4$(block 1128);

beta = 180 − delta;

$$b = \sqrt{a^2 + c^2 - 2a\,\cos(\text{beta})}$$

$$alpha = \cos^{-1}\left(\frac{b^2 + c^2 - a^2}{2bc}\right)$$

angle_detect = alpha;

d_detect = $b$.

Using these calculations and the fully parameterized model, the mathematical analysis model engine 214 builds a mathematical analysis model around the fully parameterized model (see blocks 308, 408).

Figure 12A:
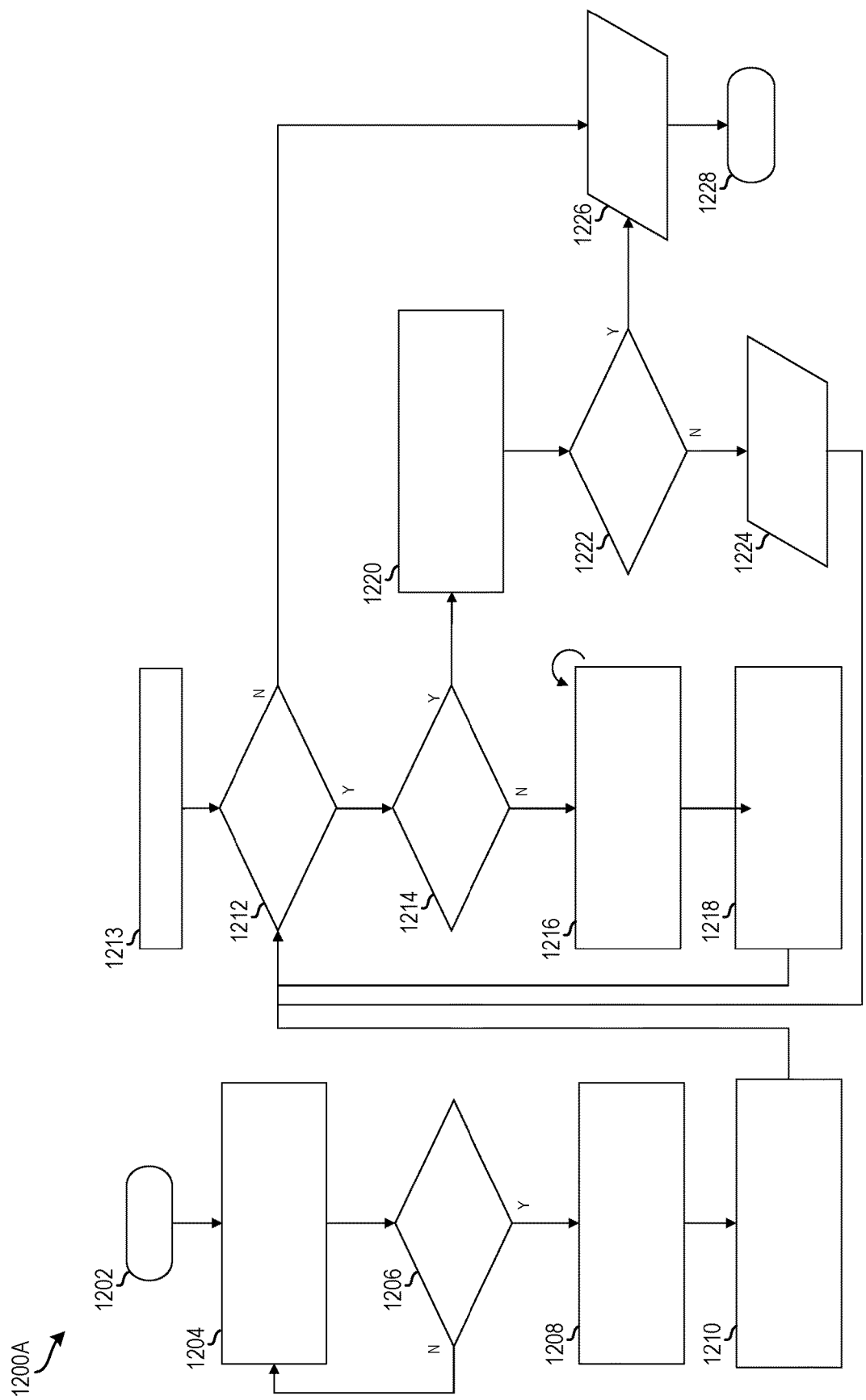
FIGS. 12A and 12B depict a method for an online advanced driver-assistance system (ADAS) to warn and/or assist an operator of a vehicle for a potential intersection collision while maneuvering a vehicle sensor coverage analysis for automated driving scenarios according to one or more embodiments described herein.
Figure 12B:
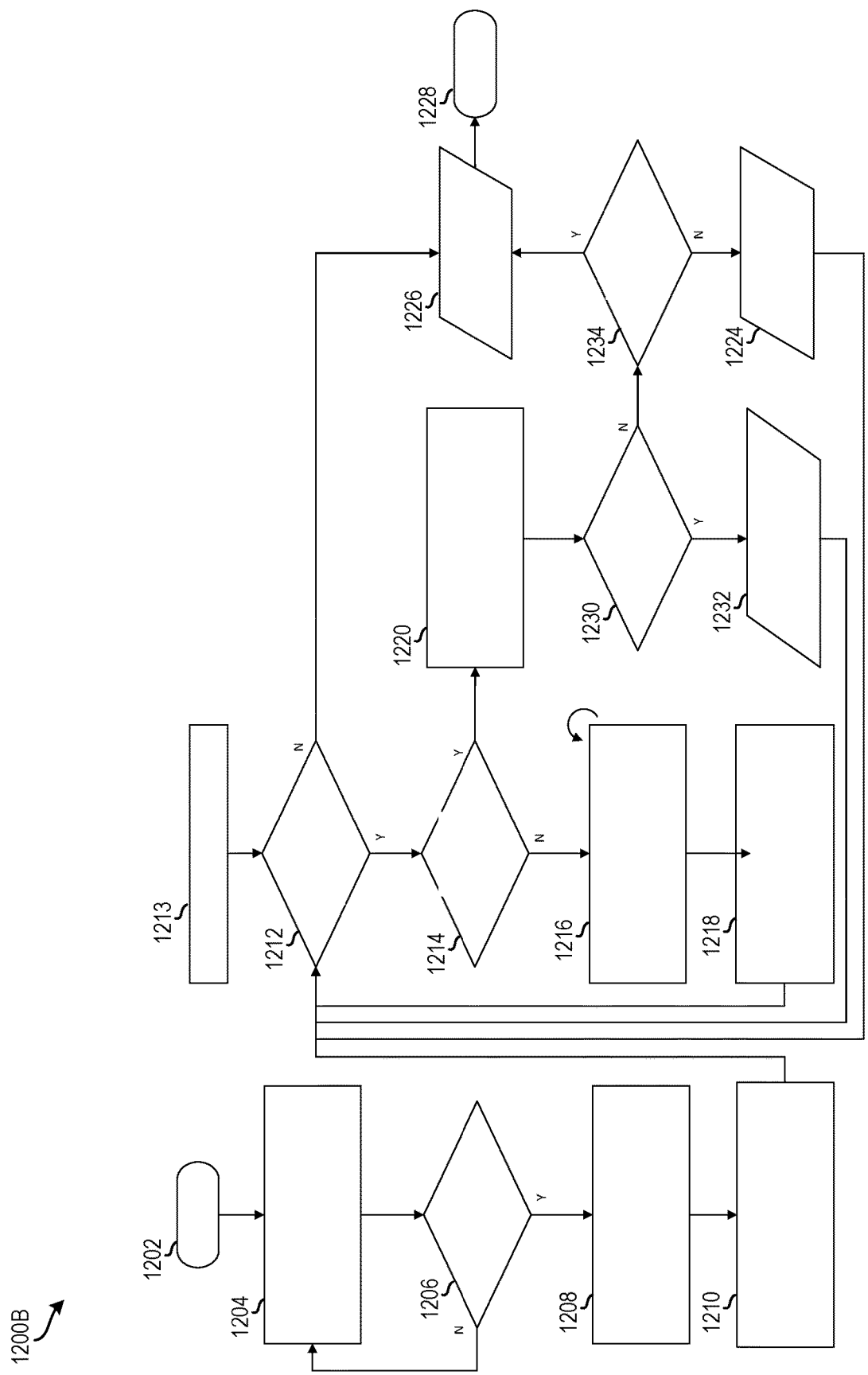

FIGS. 12A and 12B depict methods 1200A, 1200B respectively for in-vehicle logic of the vehicle 100 according to one or more embodiments described herein. For in-vehicle applications, the methods 1200A, 1200B estimate the threat of what the vehicle 100 is detecting to alert and/or control the vehicle 100 to avoid/minimize collisions. The method 1200A begins at block 1202 and continues to block 1204 where the vehicle location is obtained using GPS, a high-definition map, etc. Other semantic detections could include road edge, lane lines, traffic signs, etc., that help fill the gaps from the available HD maps metadata and/or replace the dependency of the HP map metadata. At block 1206, it is determined whether the vehicle is at an intersection. If not, the method 1200A loops back to block 1204. If the vehicle is determined to be at an intersection at block 1206, the method 1200A proceeds to block 1208 and uses vehicle sensor semantic detections and a high-definition map to obtain intersection properties. Semantic detections are the data results from the vehicle sensors, meaning identified or detected objects, which can include vehicles, motorcycles, pedestrians, etc. At block 1210, a low-fidelity analytical model is used to estimate time required for the host vehicle to complete left/right turn maneuver. This is referring to the low-fidelity analytical model determined at block 308 of FIG. 3, for example. It is then determined, at block 1214, whether any actors are approaching the intersection using input vehicle sensor object detections (block 1213). If an actor is approaching the intersection, it is determined at block 1214 whether all actors approaching the intersection are being tracked. If not, velocity acceleration, and location information relative to the host for a unique actor are obtained iteratively at block 1216 and the low fidelity model is used to estimate time for the actor to reach the intersection/host at block 1218. If all actors approaching the intersection are being tracked at block 1214, the method 1200A proceeds to compare a time for each actor to reach the intersection/host with time required for host to complete the turn at block 1220. If the host vehicle is not moving, an amount of time required to complete the turn/maneuver is estimated. This can be done with a preset/calibrated value(s) that is compared to a time of arrival. It is then determined whether there is enough time for the host to complete the turn at block 1222. If not, a "do not turn" message is displayed at block 1224; if so, an "OK to turn" message is displayed at block 1226. The method 1200B ends at block 1228.

The method 1200B differs from the method 1200A as shown with respect to blocks 1230, 1232, 1234 as shown. In particular, the method 1200B begins at block 1202 and continues to block 1204 where the vehicle location is obtained using GPS, a high-definition map, etc. At block 1206, it is determined whether the vehicle is at an intersection. If not, the method 1200B loops back to block 1204. If the vehicle is determined to be at an intersection at block 1206, the method 1200B proceeds to block 1208 and uses vehicle sensor semantic detections and a high-definition map to obtain intersection properties. At block 1210, a low fidelity model is used to estimate time required for the host vehicle to complete left/right turn maneuver. It is then determined, at block 1212, whether any actors are approaching the intersection using input vehicle sensor object detections (block 1213). If an actor is approaching the intersection, it is determined at block 1212 whether all actors approaching the intersection are being tracked. If not, velocity acceleration, and location information relative to the host for a unique actor are obtained iteratively at block 1216 and the low fidelity model is used to estimate time for the actor to reach the intersection/host at block 1218. If all actors approaching the intersection are being tracked at block 1214, the method 1200B proceeds to compare a time for each actor to reach the intersection/host with time required for host to complete the turn at block 1220. It is then determined whether a collision is imminent or unavoidable at block 1230. If a collision is imminent or unavoidable at block 1230, the vehicle's movement is prevented/stopped and passive safety devices are prepared or activated at block 1232. If a collision is not imminent or unavoidable at block 1230, it is determined whether there is enough time for the host to safely complete the turn at block 1234. If not, a "do not turn" message is displayed at block 1224; if so, an "OK to turn" message is displayed at block 1226. The method 1200B ends at block 1228.

Figure 13:
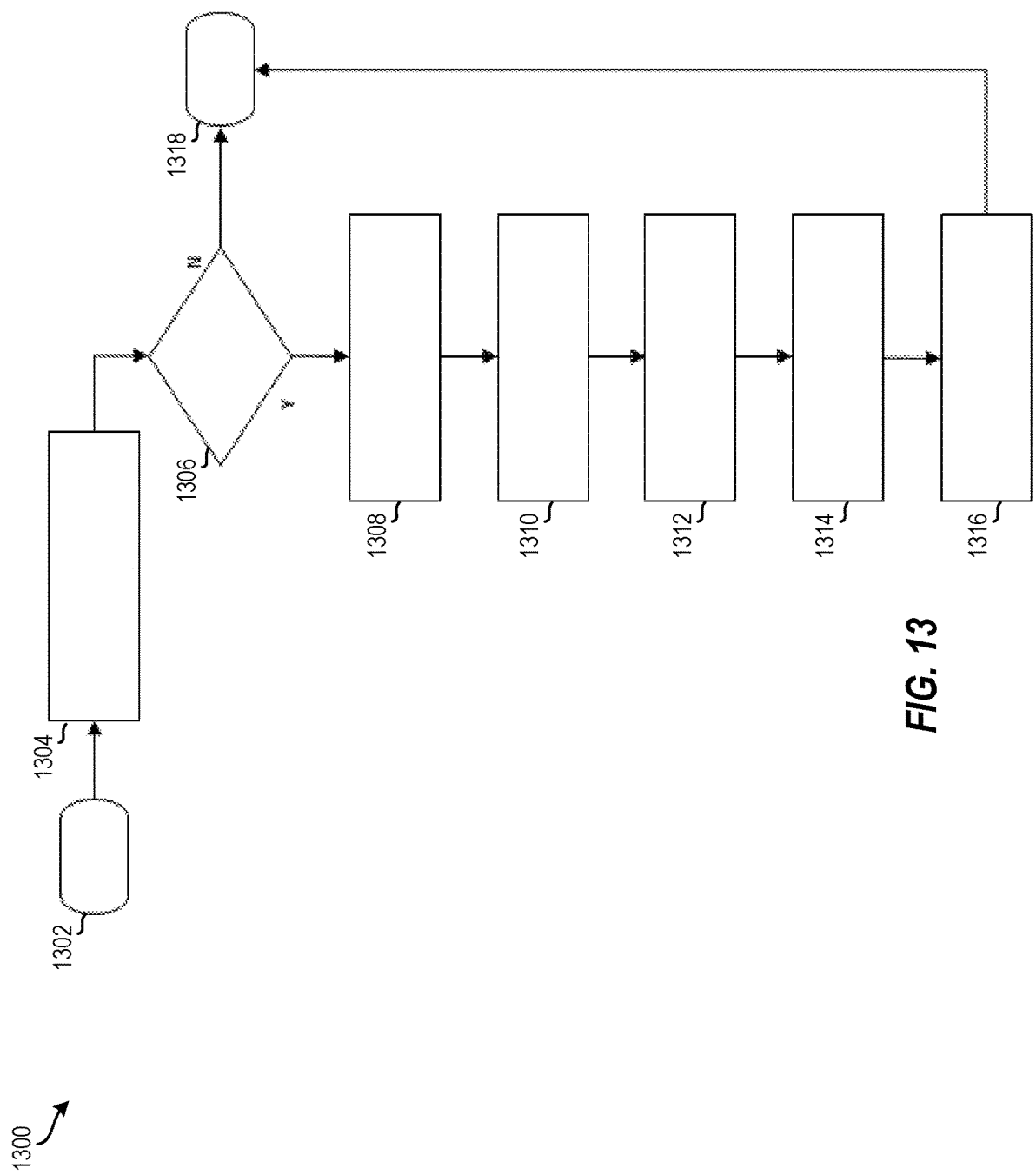
FIG. 13 depicts a method for sensor coverage analysis for automated driving scenarios according to one or more embodiments described herein.

FIG. 13 depicts a method 1300 for sensor coverage analysis for automated driving scenarios according to one or more embodiments described herein. The method 400 can be implemented by any suitable processing system, processing device, or combination thereof, including those processing system(s) and processing device(s) described herein, including the processing systems 110 and 200 of FIGS. 1 and 2 but is not so limited.

The method 1300 begins at block 1302, and at block 1304 intersection and scenario parameters are input for analysis. At block 1306, it is determined if the parameters are available; if not, the method 1300 terminates 1318. However, if parameters are available, at block 1308 host arc turn through intersection is computed. At block 1310, host arc turn travel until actor initiates reaction is computed. At block 1312, actor variable distances traveled during reaction are calculated. At block 1314, road curvature arch angle and distance are calculated. At block 1316, detection angle and distance relative to the host are computed. The method 1300 ends at block 1318.

It is understood that one or more embodiments described herein is capable of being implemented in conjunction with any other type of computing environment now known or later developed. For example, FIG. 14 depicts a block diagram of a processing system 1400 for implementing the techniques described herein. In accordance with one or more embodiments described herein, the processing system 1400 is an example of a cloud computing node of a cloud computing environment. In examples, processing system 1400 has one or more central processing units ("processors" or "processing resources") 1421a, 1421b, 1421c, etc. (collectively or generically referred to as processor(s) 1421 and/or as processing device(s)). In aspects of the present disclosure, each processor 1421 can include a reduced instruction set computer (RISC) microprocessor. Processors 1421 are coupled to system memory (e.g., random access memory (RAM) 1424) and various other components via a system bus 1433. Read only memory (ROM) 1422 is coupled to system bus 1433 and may include a basic input/output system (BIOS), which controls certain basic functions of processing system 1400.

Further depicted are an input/output (I/O) adapter 1427 and a network adapter 1426 coupled to system bus 1433. I/O adapter 1427 may be a small computer system interface (SCSI) adapter that communicates with a hard disk 1423 and/or a storage device 1425 or any other similar component. I/O adapter 1427, hard disk 1423, and storage device 1425 are collectively referred to herein as mass storage 1434. Operating system 1440 for execution on processing system 1400 may be stored in mass storage 1434. The network adapter 1426 interconnects system bus 1433 with an outside network 1436 enabling processing system 1400 to communicate with other such systems.

A display (e.g., a display monitor) 1435 is connected to system bus 1433 by display adapter 1432, which may include a graphics adapter to improve the performance of graphics intensive applications and a video controller. In one aspect of the present disclosure, adapters 1426, 1427, and/or 1432 may be connected to one or more I/O busses that are connected to system bus 1433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1433 via user interface adapter 1428 and display adapter 1432. A keyboard 1429, mouse 1430, and speaker 1431 may be interconnected to system bus 1433 via user interface adapter 1428, which may include, for example, a Super I/O chip integrating multiple device adapters into a single integrated circuit.

In some aspects of the present disclosure, processing system 1400 includes a graphics processing unit 1437. Graphics processing unit 1437 is a specialized electronic circuit designed to manipulate and alter memory to accelerate the creation of images in a frame buffer intended for output to a display. In general, graphics processing unit 1437 is very efficient at manipulating computer graphics and image processing, and has a highly parallel structure that makes it more effective than general-purpose CPUs for algorithms where processing of large blocks of data is done in parallel.

Thus, as configured herein, processing system 1400 includes processing capability in the form of processors 1421, storage capability including system memory (e.g., RAM 1424), and mass storage 1434, input means such as keyboard 1429 and mouse 1430, and output capability including speaker 1431 and display 1435. In some aspects of the present disclosure, a portion of system memory (e.g., RAM 1424) and mass storage 1434 collectively store the operating system 1440 to coordinate the functions of the various components shown in processing system 1400.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A computer-implemented method comprising:
    defining, by a processing device, a plurality of parameters so that any orthogonal intersection can be described;
    building, by the processing device, an orthogonal parameterized model that can represent any orthogonal intersection based at least in part on the plurality of parameters that can describe any intersection of interest;
    expanding, by the processing device, the orthogonal parameterized model to generate a fully parameterized intersection model that accounts for intersection complexities including accounting for a total lateral distance from a stop bar associated with the vehicle to a center left target line in meters and a total longitudinal distance from the stop bar associated with the vehicle to the center left target line in meters; and
    building, by the processing device, a low-fidelity analytical that computes various metrics based on the fully parameterized intersection model.

2. The computer-implemented method of claim 1, wherein building the orthogonal parameterized model further comprises representing a vehicle as an ellipse.

3. The computer-implemented method of claim 2, wherein expanding the orthogonal parameterized model further comprises calculating the ellipse is based on the following formula for the vehicle when the vehicle is turning left:

$$EllipC = \pi(a+b)\left(3 - \frac{(a-b)^2}{(a+b)^2\left(\sqrt{-3\frac{(a-b)^2}{(a+b)^2}+4}+10\right)} + 1\right)$$

where "a" is the total lateral distance from a stop bar associated with the vehicle to the center left target line in meters, and where "b" is the total longitudinal distance from the stop bar associated with the vehicle to the center left target line in meters.

4. The computer-implemented method of claim 3, further comprising calculating an arcturn distance of the vehicle based on the ellipse.

5. The computer-implemented method of claim 3, further comprising calculating an arcturn time of the vehicle based on the ellipse.

6. The computer-implemented method of claim 1, wherein the intersection complexities comprise at least one of a positive road curvature, a negative road curvature, and an intersection angle.

7. The computer-implemented method of claim 1, wherein the intersection complexities comprise a positive road curvature, a negative road curvature, and an intersection angle.

8. The computer-implemented method of claim 1, further comprising:
using vehicle sensor semantic detections and a high-definition map to obtain intersection properties;
using the low-fidelity analytical model to estimate a time required for a host vehicle to complete a maneuver;
obtaining a velocity, an acceleration, and a location relative to the host vehicle for a plurality of actors;
using the low-fidelity analytical model to estimate time for actor to reach an intersection or the host vehicle; and
displaying a message to a user whether it is safe to perform the maneuver.

9. The computer-implemented method of claim 8, wherein the intersection properties comprise a number of lanes, a lane width, and a road curvature.

10. The computer-implemented method of claim 1, further comprising:
setting parameter values for the intersection of interest;
setting a velocity, an acceleration, and a location relative to a host vehicle for a plurality of actors;
using the low-fidelity analytical model to estimate how far away from the host vehicle the plurality of actors need to be detected so that the host vehicle can safely complete a maneuver; and
designing a sensor placement arrangement that defines a location for each of a plurality of sensors associated with the host vehicle.

11. A system comprising:
a memory comprising computer readable instructions; and
a processing device for executing the computer readable instructions, the computer readable instructions controlling the processing device to perform operations comprising:
defining, by the processing device, a plurality of parameters so that any orthogonal intersection can be described;
building, by the processing device, an orthogonal parameterized model that can represent any orthogonal intersection based at least in part on the plurality of parameters that can describe any intersection of interest, wherein building the orthogonal parameterized model further comprises representing a vehicle as an ellipse;
expanding, by the processing device, the orthogonal parameterized model to generate a fully parameterized intersection model that accounts for intersection complexities by calculating the ellipse is based on the following formula for the vehicle when the vehicle is turning left:

$$EllipC = \pi(a+b)\left(3 - \frac{(a-b)^2}{(a+b)^2\left(\sqrt{-3\frac{(a-b)^2}{(a+b)^2}+4}+10\right)} + 1\right)$$

where "a" is a total lateral distance from a stop bar associated with the vehicle to a center left target line in meters, and where "b" is a total longitudinal distance from the stop bar associated with the vehicle to the center left target line in meters; and
building, by the processing device, a low-fidelity analytical that computes various metrics based on the fully parameterized intersection model.

12. The system of claim 11, wherein the intersection complexities comprise at least one of a positive road curvature, a negative road curvature, and an intersection angle.

13. The system of claim 11, wherein the intersection complexities comprise a positive road curvature, a negative road curvature, and an intersection angle.

14. The system of claim 11, wherein the operations further comprise:
using vehicle sensor semantic detections and a high-definition map to obtain intersection properties;
using the low-fidelity analytical model to estimate a time required for a host vehicle to complete a maneuver;
obtaining a velocity, an acceleration, and a location relative to the host vehicle for a plurality of actors;
using the low-fidelity analytical model to estimate time for actor to reach an intersection or the host vehicle; and
displaying a message to a user whether it is safe to perform the maneuver.

15. The system of claim 14, wherein the intersection properties comprise a number of lanes, a lane width, and a road curvature.

16. The system of claim 11, wherein the operations further comprise:
setting parameter values for the intersection of interest;
setting a velocity, an acceleration, and a location relative to a host vehicle for a plurality of actors;
using the low-fidelity analytical model to estimate how far away from the host vehicle the plurality of actors need to be detected so that the host vehicle can safely complete a maneuver; and designing a sensor placement arrangement that defines a location for each of a plurality of sensors associated with the host vehicle.

17. A computer program product comprising a computer readable storage medium having program instructions embodied therewith, the program instructions executable by a processor to cause the processor to perform operations comprising:

- defining, by the processing device, a plurality of parameters so that any orthogonal intersection can be described;
- building, by the processing device, an orthogonal parameterized model that can represent any orthogonal intersection based at least in part on the plurality of parameters that can describe any intersection of interest, wherein building the orthogonal parameterized model further comprises representing a vehicle as an ellipse;
- expanding, by the processing device, the orthogonal parameterized model to generate a fully parameterized intersection model that accounts for intersection complexities, and wherein expanding the orthogonal parameterized model further comprises calculating the ellipse is based on the following formula for the vehicle when the vehicle is turning left:

$$EllipC = \pi(a+b)\left(3\frac{(a-b)^2}{(a+b)^2\left(\sqrt{-3\frac{(a-b)^2}{(a+b)^2}+4}+10\right)}+1\right)$$

where "a" is a total lateral distance from a stop bar associated with the vehicle to a center left target line in meters, and where "b" is a total longitudinal distance from the stop bar associated with the vehicle to the center left target line in meters; and building, by the processing device, a low-fidelity analytical that computes various metrics based on the fully parameterized intersection model.

18. The method of claim 8, wherein the vehicle sensor semantic detections comprise data results from a plurality of vehicle sensors, and the data results include identified and detected objects.

19. The method of claim 18, wherein the identified and detected objects include at least one of vehicles motorcycles and pedestrians.

20. The method of claim 14, wherein the vehicle sensor semantic detections comprise data results from a plurality of vehicle sensors, and the data results include identified and detected objects.

* * * * *